(12) United States Patent
Koyanagi et al.

(10) Patent No.: US 9,977,359 B2
(45) Date of Patent: May 22, 2018

(54) ELECTROPHOTOGRAPHIC MEMBER, METHOD OF PRODUCING THE SAME, PROCESS CARTRIDGE, AND ELECTROPHOTOGRAPHIC APPARATUS

(71) Applicant: CANON KABUSHIKI KAISHA, Tokyo (JP)

(72) Inventors: Takashi Koyanagi, Mishima (JP); Masaki Yamada, Mishima (JP); Shohei Urushihara, Suntou-gun (JP); Hideya Arimura, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/421,570

(22) Filed: Feb. 1, 2017

(65) Prior Publication Data
US 2017/0227880 A1 Aug. 10, 2017

(30) Foreign Application Priority Data
Feb. 5, 2016 (JP) .................................. 2016-020885

(51) Int. Cl.
*G03G 15/02* (2006.01)
*C08F 226/06* (2006.01)
(Continued)

(52) U.S. Cl.
CPC ....... *G03G 15/0233* (2013.01); *C08F 226/06* (2013.01); *C08G 18/42* (2013.01);
(Continued)

(58) Field of Classification Search
CPC ............ C03G 15/0233; C03G 15/0818; C08F 226/06; C09D 139/04; C09D 175/04;
(Continued)

(56) References Cited

U.S. PATENT DOCUMENTS 3,994,994 A * 11/1976 Stolka .................. C08F 293/00
430/71
7,797,833 B2 9/2010 Nakamura et al.
(Continued)

FOREIGN PATENT DOCUMENTS

JP   2004-333682 A   11/2004
JP   2012-127981 A    7/2012
(Continued)

*Primary Examiner* — Michael M Bernshteyn
(74) *Attorney, Agent, or Firm* — Fitzpatrick Cella Harper and Scinto

(57) ABSTRACT

Provided is an electrophotographic member that is excellent in charge-imparting performance for a toner, and that hardly causes tackiness on its surface even when placed under a high-temperature and high-humidity environment over a long time period. The electrophotographic member includes a substrate and a surface layer, in which the surface layer satisfies the following requirements (A) and (B): (A) the surface layer contains, in a region from its surface to a depth of up to 0.1 μm, a copolymer containing a constituent unit represented by the following structural formula (1), and at least one selected from the group consisting of a constituent unit represented by the following structural formula (2) and a constituent unit represented by the following structural formula (3); and (B) the concentration of a nitrogen atom derived from a nitrogen-containing aromatic heterocyclic amine structure in the copolymer is from 6.0 mass % to 30.0 mass %.

(1)

(Continued)

-continued

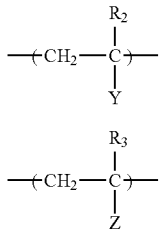

(2)

$$-\text{(CH}_2-\underset{\underset{Z}{|}}{\overset{\overset{R_3}{|}}{C}})-$$

(3)

8 Claims, 2 Drawing Sheets

(51) Int. Cl.
*C09D 139/04* (2006.01)
*C09D 175/04* (2006.01)
*G03G 15/08* (2006.01)
*C08G 18/48* (2006.01)
*C08G 18/62* (2006.01)
*C08G 18/69* (2006.01)
*C08G 18/42* (2006.01)
*C08G 18/44* (2006.01)

(52) U.S. Cl.
CPC ......... *C08G 18/44* (2013.01); *C08G 18/4825* (2013.01); *C08G 18/4854* (2013.01); *C08G 18/6216* (2013.01); *C08G 18/69* (2013.01); *C09D 139/04* (2013.01); *C09D 175/04* (2013.01); *G03G 15/0818* (2013.01)

(58) Field of Classification Search
CPC ............ C08G 18/4825; C08G 18/4854; C08G 18/6216; C08G 18/69; C08G 18/42; C08G 18/44
USPC ........................................................ 524/507
See application file for complete search history.

(56) References Cited

U.S. PATENT DOCUMENTS

| | | |
|---|---|---|
| 7,799,398 B2 | 9/2010 | Nakamura et al. |
| 8,529,806 B2 | 9/2013 | Kawamura et al. |
| 8,600,273 B2 | 12/2013 | Yamada et al. |
| 8,655,222 B2 | 2/2014 | Nakamura et al. |
| 8,655,238 B2 | 2/2014 | Uno et al. |
| 8,706,011 B2 | 4/2014 | Anan et al. |
| 8,768,226 B2 | 7/2014 | Koyanagi et al. |
| 8,768,227 B2 | 7/2014 | Urushihara et al. |
| 8,774,677 B2 | 7/2014 | Sakurai et al. |
| 8,798,508 B2 | 8/2014 | Yamada et al. |
| 8,837,985 B2 | 9/2014 | Ishida et al. |
| 8,846,287 B2 | 9/2014 | Yamada et al. |
| 8,874,007 B2 | 10/2014 | Kawamura et al. |
| 8,874,012 B2 | 10/2014 | Yamada et al. |
| 8,913,930 B2 | 12/2014 | Ishii et al. |
| 9,581,931 B2* | 2/2017 | Yamada ............... G03G 5/071 |
| 9,599,913 B2 | 3/2017 | Nishioka et al. |
| 9,625,854 B2* | 4/2017 | Koyanagi .......... G03G 15/0818 |
| 2013/0164038 A1 | 6/2013 | Kusaba et al. |
| 2013/0266339 A1 | 10/2013 | Sugiyama et al. |
| 2014/0221184 A1 | 8/2014 | Arimura et al. |
| 2015/0331339 A1 | 11/2015 | Yamada et al. |
| 2015/0331340 A1 | 11/2015 | Nishioka et al. |
| 2015/0331341 A1 | 11/2015 | Yamaguchi et al. |
| 2015/0331342 A1 | 11/2015 | Yamaguchi et al. |
| 2015/0331343 A1* | 11/2015 | Yamada ............... G03G 5/071 492/18 |
| 2015/0331346 A1 | 11/2015 | Yamauchi et al. |
| 2015/0331347 A1 | 11/2015 | Arimura et al. |
| 2015/0355570 A1* | 12/2015 | Koyanagi .......... G03G 15/0818 428/411.1 |
| 2016/0187801 A1 | 6/2016 | Yamada et al. |
| 2016/0187809 A1 | 6/2016 | Yamaguchi et al. |
| 2016/0363881 A1 | 12/2016 | Urushihara et al. |
| 2017/0060007 A1 | 3/2017 | Yamada et al. |

FOREIGN PATENT DOCUMENTS

| | | |
|---|---|---|
| JP | 2012-181367 A | 9/2012 |
| JP | 2013-033238 A | 2/2013 |

* cited by examiner

FIG. 1A
FIG. 1B
FIG. 1C
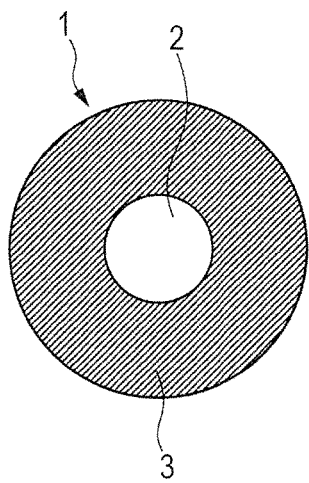
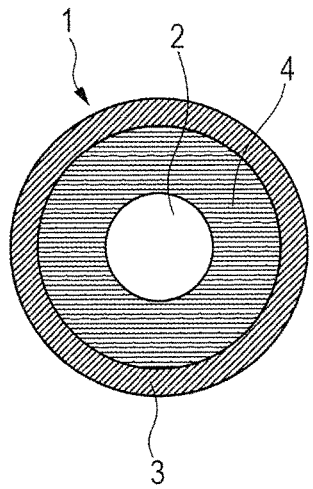
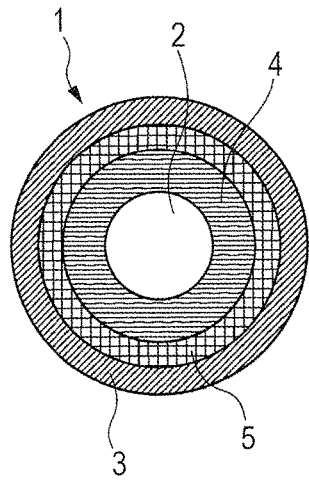
FIG. 2
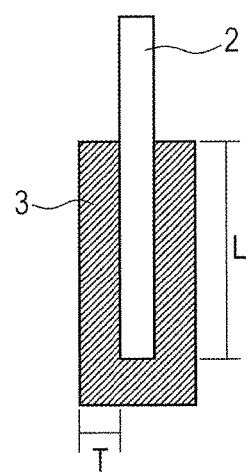

ELECTROPHOTOGRAPHIC MEMBER, METHOD OF PRODUCING THE SAME, PROCESS CARTRIDGE, AND ELECTROPHOTOGRAPHIC APPARATUS

BACKGROUND OF THE INVENTION

Field of the Invention

The present invention relates to an electrophotographic member to be used in an electrophotographic apparatus, a method of producing the electrophotographic member, and a process cartridge and an electrophotographic apparatus each including the electrophotographic member.

Description of the Related Art

In an electrophotographic apparatus (such as a copying machine, facsimile, or printer employing an electrophotographic system), first, a photosensitive member is charged by a charging unit, and an electrostatic latent image is formed on the photosensitive member by laser exposure. Then, a developer (hereinafter sometimes referred to as "toner") in a developing container is conveyed by a developing member, and the electrostatic latent image on the photosensitive member is developed with the toner in a portion where the photosensitive member and the developing member are brought into close contact with each other. After that, the toner on the photosensitive member is transferred onto a recording sheet by a transferring unit and fixed onto the recording sheet with heat and a pressure.

In the electrophotographic apparatus, electrophotographic members, such as a developer carrying member, a charging member, a developer supplying/stripping member, a cleaning blade, and a developer regulating member, are used. Electro-conductive layers are arranged in some of those electrophotographic members.

In, for example, an electrophotographic image-forming process, the impartment of charge to the toner is performed by the friction of the toner between both or either of the following combinations: the developer carrying member and the developer regulating member; and/or the developer carrying member and the developer supplying/stripping member. Here, stable charging of the toner is important for the formation of a high-quality electrophotographic image.

In Japanese Patent Application Laid-Open No. 2004-333682, there is a disclosure of a developer carrying member including a substrate and a resin layer on the substrate, in which the resin layer is formed of a resin composition containing a silane coupling agent, and a binder resin that the resin layer contains has a copolymer of a vinyl polymerizable monomer and a nitrogen-containing vinyl monomer.

In addition, in Japanese Patent Application Laid-Open No. 2012-181367, as a developer carrying member that can stably impart charge to a toner even under a high-temperature and high-humidity environment, there is a disclosure of a developer carrying member whose surface layer contains: a copolymer having a constituent unit having a pyridinium structure and a constituent unit having a tertiary amino group; and polyurethane.

Further, in Japanese Patent Application Laid-Open No. 2013-33238, there is a disclosure of a developer carrying member including an elastic layer containing a silicone rubber and a surface layer covering the surface of the elastic layer, in which the surface layer contains a copolymer having: a constituent unit having a quaternary ammonium salt structure having a specific structure; and a tertiary amine structure having a specific structure.

An investigation made by the inventors of the present invention has confirmed that the developer carrying member according to the invention disclosed in each of the above-mentioned Japanese patent laid-open application publications is excellent in charge-imparting performance for a toner. However, as a result of their further investigation, the inventors of the present invention have found that when any such developer carrying member is placed under a high-temperature and high-humidity (e.g., a temperature of 40° C. and a relative humidity of 95% (hereinafter sometimes referred to as "95% RH")) environment over a long time period, tackiness may be expressed on the surface of the developer carrying member. It is assumed that a toner sticks to the developer carrying member in which the tackiness has occurred on the surface to cause a defect in an electrophotographic image.

SUMMARY OF THE INVENTION

One embodiment of the present invention is directed to the provision of an electrophotographic member that is excellent in charge-imparting performance for a toner, and that hardly causes tackiness on its surface even when placed under a high-temperature and high-humidity environment over a long time period. In addition, other embodiments of the present invention are directed to the provision of a process cartridge and an electrophotographic apparatus conducive to stable formation of a high-quality electrophotographic image.

According to one embodiment of the present invention, there is provided an electrophotographic member, including:
a substrate; and
a surface layer,
in which the surface layer satisfies the following requirements (A) and (B).
(A) The surface layer contains, in a region from a surface thereof to a depth of up to 0.1 μm, a copolymer containing:
a constituent unit represented by the following structural formula (1); and
at least one selected from the group consisting of a constituent unit represented by the following structural formula (2) and a constituent unit represented by the following structural formula (3).
(B) A concentration of a nitrogen atom derived from a nitrogen-containing aromatic heterocyclic amine structure in the copolymer is from 6.0 mass % to 30.0 mass %.

In the structural formula (1), $R_1$ represents a methyl group or a hydrogen atom, and X represents an atomic group having a nitrogen-containing aromatic heterocyclic amine structure.

In the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms.

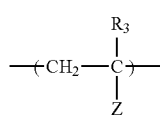

(3)

In the structural formula (3), $R_3$ represents a methyl group or a hydrogen atom, and Z represents an atomic group having a silicone structure.

In addition, according to another embodiment of the present invention, there is provided a method of producing an electrophotographic member including a substrate and a surface layer, the method including forming the surface layer by applying, to the substrate, a copolymer containing:

a constituent unit represented by the structural formula (1); and at least one selected from the group consisting of a constituent unit represented by the structural formula (2) and a constituent unit represented by the structural formula (3).

Further, according to other embodiments of the present invention, there are provided a process cartridge removably mounted onto an electrophotographic apparatus, the process cartridge including the electrophotographic member, and an electrophotographic apparatus including the electrophotographic member.

Further features of the present invention will become apparent from the following description of exemplary embodiments with reference to the attached drawings.

BRIEF DESCRIPTION OF THE DRAWINGS

FIG. 1A, FIG. 1B, and FIG. 1C are each a schematic sectional view of an example of an electrophotographic roller according to one aspect of the present invention.

FIG. 2 is a schematic sectional view of an example of an electrophotographic blade according to one aspect of the present invention.

DESCRIPTION OF THE EMBODIMENTS

Figure 3:
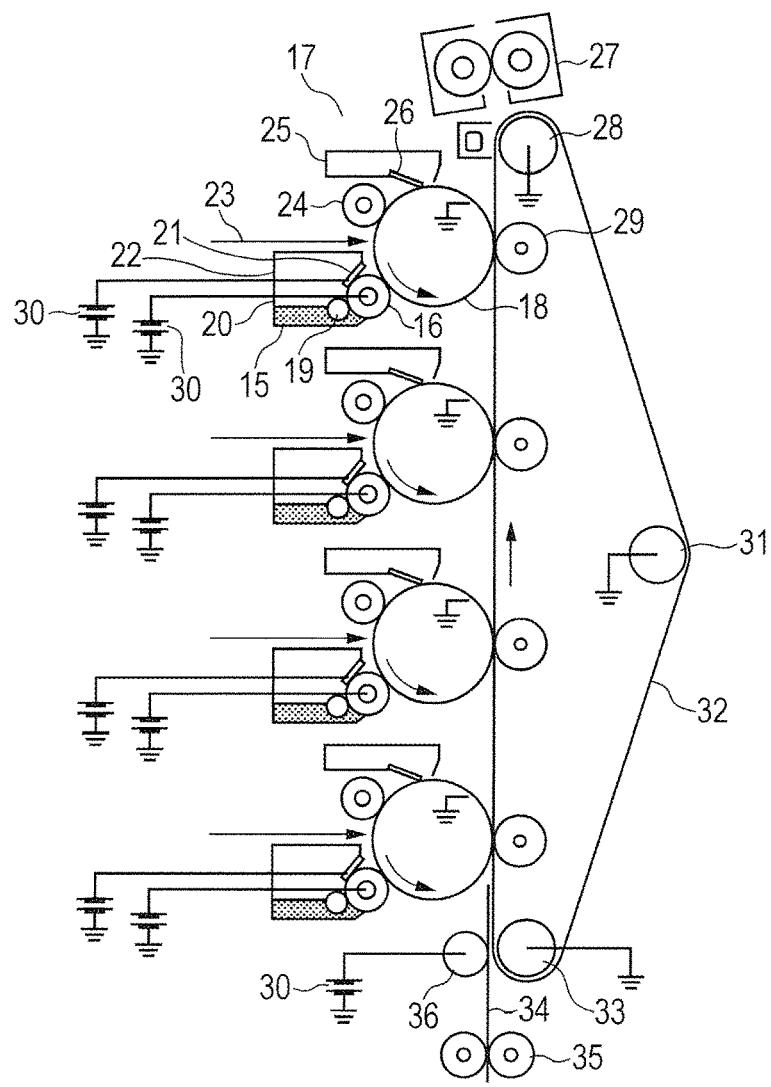
FIG. 3 is a schematic sectional view of an example of an electrophotographic apparatus according to one aspect of the present invention.

Preferred embodiments of the present invention will now be described in detail in accordance with the accompanying drawings.

<Electrophotographic Member>

An electrophotographic member according to one embodiment of the present invention includes an electro-conductive substrate and a surface layer arranged on the substrate. A roller-shaped electrophotographic member (electrophotographic roller) serving as an example of the electrophotographic member is illustrated in each of FIG. 1A to FIG. 1C. An electrophotographic roller 1 illustrated in FIG. 1A includes an electro-conductive substrate 2 and a surface layer 3 arranged on the outer periphery thereof, wherein the surface layer is formed of an electro-conductive resin layer. As illustrated in FIG. 1B, an elastic layer 4 may be arranged between the substrate 2 and the surface layer 3. In addition, the electrophotographic roller 1 may be of a three-layer structure in which an intermediate layer 5 is further arranged between the elastic layer 4 and the surface layer 3 as illustrated in FIG. 1C, or may be of a multilayer structure in which a plurality of the intermediate layers 5 are arranged.

The layer construction of the electrophotographic roller 1 is not limited to the constructions illustrated in FIG. 1A to FIG. 1C. Like, for example, such a construction that the electrophotographic roller 1 further includes a surface layer on the electro-conductive resin layer arranged on the outer periphery of the substrate 2, the surface layer may be formed by laminating one or more other resin layers or protective layers on the outer periphery of the resin layer. The roller may be configured to include a resin layer as the intermediate layer 5. In order that the benefit of the present invention may be effectively obtained, the electrophotographic roller of the present invention is preferably of a construction in which the resin layer is present as the surface layer 3 in the outermost surface layer as illustrated in each of FIG. 1A to FIG. 1C out of the foregoing constructions. In addition, the electrophotographic roller 1 preferably includes the elastic layer 4.

As another example of the electrophotographic member, a blade-shaped electrophotographic member (electrophotographic blade) is given. FIG. 2 is a schematic sectional view of the electrophotographic blade. The electrophotographic blade includes the electro-conductive substrate 2 and the electro-conductive surface layer 3 arranged on the outer periphery thereof.

The electrophotographic member according to one aspect of the present invention can be used in each of a developer carrying member, a charging member, a developer supplying/stripping member, a developer regulating member, and a cleaning blade. In particular, the member can be suitably used as a developer carrying member or a developer regulating member. The construction of the electrophotographic member according to one embodiment of the present invention is described in detail below.

[Substrate]

The electro-conductive substrate 2 serves as an electrode and a support member for the electrophotographic member 1. The substrate is formed of an electro-conductive material, such as: a metal or an alloy, such as aluminum, a copper alloy, or stainless steel; iron plated with chromium or nickel; or a synthetic resin having electro-conductivity.

In order to enhance the adhesive property between the substrate and the elastic layer to be described later, a primer may be applied to a surface of the substrate. Examples of the primer include a silane coupling agent-based primer, and thermosetting resins or thermoplastic resins, such as urethane-based, acrylic, polyester-based, polyether-based, or epoxy-based resins. The following are given as a commercially available primer: "DY39-051", "DY39-012", and "DY39-115" (all of which are trade names: manufactured by Dow Corning Toray Co., Ltd.); "X-33-173", "PRIMER-NO. 4", "PRIMER-NO. 32", and "PRIMER-NO. 35" (all of which are trade names: manufactured by Shin-Etsu Chemical Co., Ltd.); and "XP81-405", "XP81-A6361", "XP81-B7015", "ME21", "ME151", "ME153", and "XC9214" (all of which are trade names: manufactured by Momentive Performance Materials Japan LLC).

A known alkoxysilane, titanate ester, or the like may be added to the primer in order to enhance the adhesive property thereof. Specific examples of the alkoxysilane or titanate ester include tetramethoxysilane, tetraethoxysilane, tetra-n-butoxysilane, tetraethoxytitanium, tetraisopropoxytitanium, and tetra-n-butoxytitanium. The addition amount thereof is preferably from 0.1 part by mass to 20 parts by mass with respect to 100 parts by mass of the primer.

[Elastic Layer]

When the electrophotographic member is of a roller shape, i.e., when the member is an electrophotographic roller, the elastic layer 4 has a function of imparting, to the electrophotographic roller 1, elasticity needed for forming a nip having a predetermined width in a portion where the electrophotographic roller 1 and a photosensitive member are brought into abutment with each other. The elastic layer 4 is preferably a molded body of a rubber material. As the rubber material, various rubber materials used hitherto in electro-conductive rubber rollers may be used. Specific examples of the rubber to be used for the rubber material include an ethylene-propylene-diene copolymerized rubber (EPDM), an acrylonitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, a hydrogenated product of NBR, a polysulfide rubber, and a urethane rubber. One kind of those rubbers may be used alone, or two or more kinds thereof may be used as a mixture. Of those, a silicone rubber is preferred particularly from the viewpoint of stability against deformation, such as setting performance. Examples of the silicone rubber include polydimethylsiloxane, polymethyltrifluoropropylsiloxane, polymethylvinylsiloxane, polyphenylvinylsiloxane, and copolymers of those polysiloxanes.

Various additives, such as an electro-conductivity-imparting agent, a non-electro-conductive filler, a crosslinking agent, and a catalyst, may be appropriately blended into the elastic layer 4. Fine particles of carbon black, of an electro-conductive metal, such as aluminum or copper, or of an electro-conductive metal oxide, such as zinc oxide, tin oxide, or titanium oxide, may be used as the electro-conductivity-imparting agent. Of those, carbon black is preferred because the carbon black in a relatively small addition amount provides good electro-conductivity.

Specifically, electro-conductive carbon blacks, such as "KETJENBLACK" (trade name, manufactured by Lion Corporation) and acetylene black, and carbon blacks for rubber, such as SAF, ISAF, HAF, FEF, GPF, SRF, FT, and MT, may be used as the carbon black. In addition, an oxidatively-treated carbon black for color ink, or a pyrolytic carbon black may be used. One kind of those carbon blacks may be used alone, or two or more kinds thereof may be used in combination. When the carbon black is used as the electro-conductivity-imparting agent, the carbon black is more preferably blended in an amount of from 10 parts by mass to 80 parts by mass with respect to 100 parts by mass of the rubber in the rubber material.

In addition, examples of the non-electro-conductive filler include silica, quartz powder, titanium oxide, zinc oxide, and calcium carbonate. Examples of the crosslinking agent include di-t-butyl peroxide, 2,5-dimethyl-2,5-di(t-butylperoxy)hexane, and dicumyl peroxide. Examples of the catalyst include a platinum-based catalyst, a rhodium-based catalyst, and a palladium-based catalyst. In particular, a platinum-based catalyst is preferred.

The elastic layer 4 may be formed of a plurality of layers. In addition, the intermediate layer 5 may be arranged between the substrate 2 and the elastic layer 4, or between the elastic layer 4 and the surface layer 3. The thickness of the elastic layer 4 is preferably from 0.25 mm to 8.00 mm, more preferably from 0.30 mm to 3.00 mm.

[Surface Layer]

The surface layer 3 satisfies the following requirements (A) and (B).

(A) The surface layer contains, in a region from a surface thereof to a depth of up to 0.1 μm, a copolymer containing: a constituent unit represented by the following structural formula (1); and at least one selected from the group consisting of a constituent unit represented by the following structural formula (2) and a constituent unit represented by the following structural formula (3).

(B) The concentration of a nitrogen atom derived from a nitrogen-containing aromatic heterocyclic amine structure in the copolymer is from 6.0 mass % to 30.0 mass %.

In the structural formula (1), $R_1$ represents a methyl group or a hydrogen atom, and X represents an atomic group having a nitrogen-containing aromatic heterocyclic amine structure.

In the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms.

In the structural formula (3), $R_3$ represents a methyl group or a hydrogen atom, and Z represents an atomic group having a silicone structure.

Under a high-temperature and high-humidity environment having, for example, a temperature of 40° C. and a relative humidity of 95%, tackiness may be expressed on the surface of an electrophotographic member including a surface layer containing a polymer compound. When the electrophotographic member having the surface on which the tackiness has occurred is used as, for example, a developer carrying member, a developer may stick to the surface. In order that triboelectric charge may be imparted to the developer, the developer needs to be rolled on the surface of the developer carrying member. However, it becomes difficult to roll the developer on the surface of the developer carrying member on which the tackiness has been expressed. As a result, charge cannot be sufficiently imparted to the developer, and hence the developability of an electrostatic latent image on an electrophotographic photosensitive member reduces. The reduction may cause a reduction in quality of an electrophotographic image.

However, the electrophotographic member including the surface layer containing the copolymer satisfying the requirements (A) and (B) is excellent in triboelectric charge-imparting performance for a toner. In addition, even when the member is placed under a high-temperature and high-humidity environment over a long time period, tackiness hardly occurs on its surface.

The inventors of the present invention have assumed the reason why the electrophotographic member according to the present invention exhibits the above-mentioned effects to be as described below.

First, the nitrogen-containing aromatic heterocyclic amine structure in the constituent unit represented by the formula (1) in the copolymer according to the present invention shows strong basicity because n-electrons on the heterocycle are delocalized. In addition, the constituent units represented by the formula (2) and the formula (3) impart, to the copolymer according to the present invention, such polarity that in a formation process for the surface layer to be described later, the copolymer can be caused to migrate to a side closer to the interface of a coating film of a paint for forming a surface layer with air (hereinafter sometimes referred to as "surface"), specifically a region from the surface of the coating film to a depth of up to 0.1 µm. That is, the copolymer is present in the region from the surface of the surface layer to a depth of up to 0.1 µm.

As a result, the heterocyclic structure having strong basicity, wherein the structure is derived from the constituent unit represented by the formula (1), is present in the region from the surface of the surface layer to a depth of up to 0.1 µm, and hence an excellent effect is exhibited in the triboelectric charge-imparting performance for a developer.

In addition, the tackiness of the surface of the surface layer may depend on the molecular mobility of a polymer component in the surface layer. In other words, when an electrophotographic member whose surface layer contains a polymer component having high molecular mobility is placed under a high-temperature and high-humidity environment, strong tackiness tends to be expressed on the surface of the surface layer. Meanwhile, when an electrophotographic member whose surface layer contains a polymer component having low molecular mobility is placed under a high-temperature and high-humidity environment, tackiness is hardly expressed on the surface of the surface layer. In the copolymer according to the present invention, the nitrogen-containing aromatic heterocyclic amine structure in the constituent unit represented by the formula (1) may reduce the molecular mobility of the copolymer. Accordingly, even when the electrophotographic member according to the present invention is placed under a high-temperature and high-humidity environment over a long time period, tackiness may hardly occur on its surface.

The constituent units (1) to (3) in the copolymer according to the present invention are described below. In the constituent unit (1) represented by the following structural formula (1), $R_1$ represents a methyl group or a hydrogen atom, and X represents an atomic group having a nitrogen-containing aromatic heterocyclic amine structure.

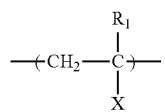

(1)

In one aspect of the present invention, the nitrogen-containing aromatic heterocyclic amine structure is defined as such a structure as described below: the structure has a ring structure showing aromaticity, a nitrogen atom serves as a member of the ring structure, and the nitrogen atom forms an amine structure. Such a structure as described below does not correspond to the nitrogen-containing aromatic heterocyclic amine structure: the structure has a ring structure showing aromaticity and a nitrogen atom serves as one member of the ring structure, but the nitrogen atom forms a quaternary ammonium salt, an amide, or an imide.

Examples of a nitrogen-containing aromatic heterocycle providing the nitrogen-containing aromatic heterocyclic amine structure are given below:

imidazole, benzimidazole, pyrazole, carbazole, pyrrole, indole, and pyridine.

In addition, examples of a polymerizable monomer providing the constituent unit (1) are given below:

nitrogen-containing heterocyclic N-vinyl compounds, such as N-vinylimidazole, N-vinylbenzimidazole, N-vinylpyrazole, N-vinylcarbazole, N-vinylpyrrole, and N-vinylindole;

nitrogen-containing heterocyclic amine compounds each containing a vinyl group, such as 2-vinylpyridine and 4-vinylpyridine;

nitrogen-containing heterocyclic amine compounds each containing an allyl group, such as 1-allylimidazole, 1-allylbenzimidazole, 1-allylpyrazole, 1-allylcarbazole, 1-allylpyrrole, and 1-allylindole; and nitrogen-containing heterocyclic amine compounds each containing an acryloyl group.

In addition to the foregoing, a compound containing an aromatic heterocyclic amine structure in which one or more nitrogen atoms serve as members of a ring structure, and having a polymerizable functional group, such as a carbon-carbon double bond, may also be used.

In the constituent unit (2) represented by the following structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms.

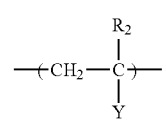

(2)

When Y in the constituent unit (2) represents an atomic group having a linear or branched alkyl structure having 10 to 18 carbon atoms, or a cycloalkyl structure having 10 to 18 carbon atoms (hereinafter sometimes collectively referred to as "alkyl structure having 10 to carbon atoms"), the copolymer can be caused to be present in the region from the surface of the surface layer to a depth of up to 0.1 µm. That is, when Y represents an alkyl structure having 10 to 18 carbon atoms, the polarity of the copolymer can be reduced. As a result, in a drying process for the coating film of the paint for forming a surface layer in the formation process for the surface layer, it can be made easier to cause the copolymer to migrate to the surface side of the coating film. As a result, the copolymer can be caused to be present in the region from the surface of the surface layer to a depth of up to 0.1 µm.

Examples of the linear or branched alkyl structure having 10 to 18 carbon atoms are given below:

a decyl group, an undecyl group, a lauryl group, a tridecyl group, a tetradecyl group, a pentadecyl group, a hexadecyl group, a heptadecyl group, an octadecyl group, and an isodecyl group.

In addition, the cycloalkyl structure having 10 to 18 carbon atoms may be formed of one ring structure, or may be formed of a plurality of ring structures. Further, the cycloalkyl structure may also be formed of the ring structure bonded with a linear or branched alkyl group as long as the structure has 10 to 18 carbon atoms.

Examples of the cycloalkyl structure having 10 to 18 carbon atoms are given below:

an isobornyl group and a 4-tert-butylcyclohexyl group.

Examples of a polymerizable monomer providing the constituent unit (2) are given below:

decyl (meth)acrylate, undecyl (meth)acrylate, lauryl (meth) acrylate, tridecyl (meth) acrylate, tetradecyl (meth) acrylate, pentadecyl (meth) acrylate, hexadecyl (meth) acrylate, heptadecyl (meth) acrylate, octadecyl (meth)acrylate, isodecyl (meth)acrylate, isobornyl (meth) acrylate, 4-tert-butylcyclohexyl (meth) acrylate, decyl (meth)acrylamide, undecyl (meth)acrylamide, lauryl (meth) acrylamide, tridecyl (meth) acrylamide, tetradecyl (meth) acrylamide, pentadecyl (meth) acrylamide, hexadecyl (meth) acrylamide, heptadecyl (meth) acrylamide, octadecyl (meth) acrylamide, isodecyl (meth) acrylamide, isobornyl (meth) acrylamide, and 4-tert-butylcyclohexyl (meth) acrylamide.

In this specification, the term "(meth)acrylate" refers to methacrylate or acrylate, and the term "(meth)acryl" refers to methacryl or acryl.

In the constituent unit (3) represented by the following structural formula (3), $R_3$ represents a methyl group or a hydrogen atom, and Z represents an atomic group having a silicone structure.

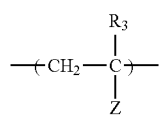

(3)

The atomic group having the silicone structure is, for example, an atomic group having a structure represented by the following structural formula (4).

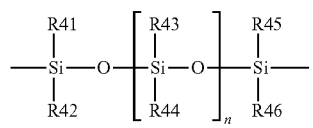

(4)

In the structural formula (4), $R_{41}$ to $R_{46}$ each independently represent an alkyl group having 1 to 3 carbon atoms or a phenyl group, and n represents an integer of 1 or more.

In addition, in the constituent unit (3), the molecular weight of the silicone structure is preferably 500 or more and 15,000 or less, more preferably 1,000 or more and 7,000 or less. When the molecular weight of the silicone structure falls within the range, the property by which the copolymer is caused to migrate to the surface side of the coating film for forming a surface layer can be improved. In addition, toner releasability from the surface of the surface layer can be further improved. In order that the effects may be further improved, the ratio of the silicone structure in the constituent unit (3) is preferably from 70.0 mass % to 99.5 mass %, more preferably from 85.0 mass % to 95.0 mass %.

A polymerizable monomer providing the constituent unit (3) is, for example, a (meth)acrylic-modified silicone compound. The weight-average molecular weight (Mw) of such polymerizable monomer is preferably from 500 to 15,000, more preferably from 1,000 to 7,000. This is because when the weight-average molecular weight falls within the range, the copolymer can be caused to be present in the region from the surface of the surface layer to a depth of up to 0.1 μm with higher reliability.

Specific examples of the polymerizable monomer providing the constituent unit (3) are given below:

"X-22-174ASX", "X-22-174BX", "KF-2012", "X-22-2426", and "X-22-2404" (all of the foregoing are trade names: manufactured by Shin-Etsu Chemical Co., Ltd.). In addition, a condensate of (meth)acrylic acid and a silicone compound containing a reactive functional group, such as a hydroxyl group, may be used. The silicone compound may contain a fluorine atom.

The concentration of a nitrogen atom derived from the nitrogen-containing aromatic heterocyclic amine structure (hereinafter sometimes simply referred to as "nitrogen atom concentration") in the copolymer according to the present invention is from 6.0 mass % to 30.0 mass %. A copolymer whose nitrogen atom concentration falls within the range is conducive to the formation of a surface layer having high triboelectric charge-imparting performance for a developer. That is, the setting of the nitrogen atom concentration in the copolymer to 6.0 mass % or more can turn the copolymer into a copolymer excellent in triboelectric charge-imparting performance for a developer. In addition, the setting of the nitrogen atom concentration to 30.0 mass % or less can suppress the establishment of a state in which a developer has excessive charge.

Specific examples of the copolymer according to the present invention include copolymers described in the following (i) to (iii):

(i) a copolymer containing the constituent unit (1) and the constituent unit (2);
(ii) a copolymer containing the constituent unit (1) and the constituent unit (3); and
(iii) a copolymer containing the constituent unit (1), the constituent unit (2), and the constituent unit (3).

The copolymer according to the present invention is not limited thereto, and may contain a constituent unit except the constituent units (1) to (3) to the extent that the requirements (A) and (B) are satisfied, and hence the effects of the present invention are obtained.

In the copolymer according to the present invention, the total of the molar ratio of the constituent unit (2) and the molar ratio of the constituent unit (3) is set to preferably from 0.5% to 80.0%, more preferably from 1.0% to 60.0%, still more preferably from 20.0% to 60.0% on the premise that the molar ratio of the constituent unit (1) is adjusted so that the nitrogen atom concentration in the copolymer may fall within the range of from 6.0 mass % to 30.0 mass %. The setting of the total of the molar ratios within the range makes it easier to cause the copolymer to be present in the region from the surface of the surface layer to a depth of up to 0.1 μm.

In addition, the copolymer according to the present invention has a weight-average molecular weight of preferably from 1,000 to 50,000, particularly preferably from 5,000 to 30,000 in order that in the drying process for the coating film of the paint for forming a surface layer, the copolymer may be caused to be present in the region from the surface of the surface layer to a depth of up to 0.1 μm.

The manner in which the copolymer is localized in the surface layer can be confirmed by measurement with a time-of-flight secondary ion mass spectrometer (TOF-SIMS). Specifically, a sample piece of an elastic body is cut out of the surface layer with a microtome, and a section of the piece is subjected to the measurement. When the measurement is started from the outermost surface of the section, it can be confirmed that the copolymer is present in a depth of up to 0.1 μm from the surface of the surface layer.

In the present invention, as the confirmation of the fact that an actual nitrogen atom concentration (measured value) in the resultant copolymer did not differ from a theoretical value, such measurement as described below was performed, and the concentration of the nitrogen atom derived from the nitrogen-containing aromatic heterocyclic amine structure in the copolymer was calculated. That is, the copolymer is extracted by dipping the sample piece of the elastic body subjected to the TOF-SIMS analysis in a solvent. After the solvent has been distilled off from the solution, the structure of the residue is identified by performing pyrolysis measurement and NMR measurement. Further, the nitrogen content thereof is calculated by performing CHN elemental analysis.

When the copolymer according to the present invention is formed only of, for example, the constituent unit (1), and the constituent unit (2) and/or the constituent unit (3), the concentration (theoretical value) of the nitrogen atom derived from the nitrogen-containing aromatic heterocyclic amine structure in the copolymer can be calculated by using the following calculation formula (5):

$$(A \times D/100)/\{(B \times D/100)+(C \times E/100)+(C' \times E'/100)\}$$ Calculation formula (5)

D, E, and E' satisfy the following calculation formula (6):

$$D+E+E'=100$$ Calculation formula (6)

where A, B, C, C', D, E, and E' represent the following:

A: the atomic weight of the nitrogen atom in the constituent unit (1) having the nitrogen-containing aromatic heterocyclic amine structure;

B: the formula weight of the constituent unit (1) having the nitrogen-containing aromatic heterocyclic amine structure;

C: the formula weight of the constituent unit (2) constituting the copolymer;

C': the formula weight of the constituent unit (3) constituting the copolymer;

D: the copolymerization mol % of the constituent unit (1) in the copolymer;

E: the copolymerization mol % of the constituent unit (2) in the copolymer; and

E': the copolymerization mol % of the constituent unit (3) in the copolymer.

The copolymer according to the present invention may be used after having been mixed with a binder resin. It has been found that even in the case where the copolymer according to the present invention is used after having been dispersed in the binder resin, when the copolymer is present in the region from the surface of the surface layer to a depth of up to 0.1 μm, and the concentration of the nitrogen atom derived from the nitrogen-containing aromatic heterocyclic amine structure in the constituent unit (1) in the copolymer is from 6.0 mass % to 30.0 mass %, the effects of the present invention are specifically expressed. The localization of the copolymer of the present invention in the surface is assumed to achieve both the suppression of the initial sticking of a toner and satisfactory triboelectric charge-imparting performance. As for a method of localizing the copolymer in the surface, a method involving utilizing a polarity difference between the copolymer and the binder resin has been known (see Japanese Patent Application Laid-Open No. 2012-127981).

When the binder resin is used, the addition amount of the copolymer according to the present invention is preferably from 0.05 part by mass to 10.0 parts by mass, more preferably from 0.10 part by mass to 5.0 parts by mass with respect to 100 parts by mass of the binder resin (solid content at the time of film formation).

From the viewpoint of polarity, examples of the binder resin include a polyurethane resin obtained by causing a polyol and an isocyanate to react with each other, a melamine curable resin obtained by causing a polyol and melamine to react with each other, and a phenol resin. Of those, a polyurethane resin obtained by causing a polyol and an isocyanate to react with each other is preferred because the resin applies a low stress to a toner and has a satisfactory abrasion characteristic. Specific examples of the polyol include an aliphatic polyester diol, a polycarbonate diol, a polybutadiene diol, a polyisoprene diol, and an acrylic polyol.

More specific examples of the aliphatic polyester diol include: polyether polyols, such as polypropylene glycol, polytetramethylene glycol, and poly-2-methyltetramethylene glycol; aliphatic polyester polyols each obtained by a condensation reaction between 1,4-butanediol or 3-methyl-1,5-pentanediol and a dicarboxylic acid, such as adipic acid or sebacic acid. In addition, an example of the polycarbonate diol is a polycarbonate diol obtained by a condensation reaction among 1,6-hexanediol or 3-methyl-1,5-pentanediol, a dicarboxylic acid, and phosgene. Further, examples of the acrylic polyol include: a bipolymer of a (meth)acrylate containing a hydroxyl group and a (meth)acrylic acid ester of an alkyl group having 8 or less carbon atoms; and a terpolymer of a (meth)acrylate containing a hydroxyl group, a (meth)acrylic acid ester of an alkyl group having 8 or less carbon atoms, and styrene.

Those polyols may each be used as a prepolymer whose chain has been extended with an isocyanate, such as 2,4-tolylene diisocyanate (TDI), 1,4-diphenylmethane diisocyanate (MDI), or isophorone diisocyanate (IPDI), in advance as required.

A moderate polarity difference can be caused between the binder resin and the copolymer according to the present invention because the resin has a film strength needed for an electrophotographic member and shows middle to high polarity. In particular, when polypropylene glycol, a polytetramethylene glycol-based polyurethane resin, and/or an aliphatic polyester polyurethane resin are each/is used as the binder resin, the amount of a deposit derived from a toner (so-called filming) is particularly small, and hence an effect of the addition of a charge-imparting agent lasts over a long time period. Accordingly, the polyurethane resin is preferably used as the binder resin.

In addition, the isocyanate to be caused to react with the polyol is not particularly limited and examples thereof may include: aliphatic polyisocyanates, such as ethylene diisocyanate and 1,6-hexamethylene diisocyanate (HDI); alicyclic polyisocyanates, such as isophorone diisocyanate (IPDI), cyclohexane 1,3-diisocyanate, and cyclohexane 1,4-diisocyanate; aromatic isocyanates, such as 2,4-tolylene diisocyanate, 2,6-tolylene diisocyanate (TDI), and diphenylmethane diisocyanate (MDI); and copolymers thereof, isocyanurates thereof, TMP adducts thereof, biuret compounds thereof, and blocked compounds thereof. One kind of those isocyanates may be used alone, or two or more kinds thereof may be used in combination. Of those, aromatic isocyanates, such as tolylene diisocyanate, diphenylmethane diisocyanate, and polymeric diphenylmethane diisocyanate, are preferred.

The polyurethane resin may be synthesized through use of each of the following methods:
(i) a one-shot method in which a polyol and an isocyanate are mixed with each other and subjected to a reaction; and
(ii) a method in which an isocyanate group-terminated prepolymer obtained by a reaction between a certain polyol and an isocyanate, and a chain extender, such as a low-molecular-weight diol or a low-molecular-weight triol, are subjected to a reaction.

The polyol and the isocyanate are preferably mixed so that the molar ratio of an isocyanate group with respect to 1.0 of a hydroxyl group of the polyol may be from 1.0 to 4.5.

When the melamine curable resin obtained by causing a polyol and melamine to react with each other is used as the binder resin, the melamine to be used is not particularly limited, but melamine of, for example, a full-alkyl type, an imino type, or a methylol type may be used. Melamine having a polymerization degree of 2.0 or less is preferably used as the melamine from the viewpoint of filming due to an increase in hardness of the surface layer. Further, the phenol resin may also be preferably used as the binder resin because the resin shows polarity comparable to that of the polyurethane resin or the melamine curable resin.

The surface layer 3 preferably has electro-conductivity. A method of imparting the electro-conductivity to the layer is, for example, the addition of an ionic conductive agent or electro-conductive fine particles. Of those, electro-conductive fine particles that are available at low cost and show a small environmental fluctuation in resistance are preferably added, and carbon black is more preferably added from the viewpoints of an electro-conductivity-imparting property and a reinforcing property. In addition, the electro-conductive fine particles to be added are particularly preferably carbon black having a primary particle diameter of from 16 nm to 50 nm and a DBP oil absorption of from 50 ml/100 g to 200 ml/100 g because a balance among its electro-conductivity, hardness, and dispersibility is satisfactory.

The same materials as those given as the examples of the electro-conductivity-imparting agent in the elastic layer 4 may each be used as the carbon black. The addition amount of the carbon black to be added to the surface layer is preferably from 10 parts by mass to 30 parts by mass with respect to 100 parts by mass of a resin solid content forming the surface layer.

Besides the carbon black, as an electro-conductive agent that may be used, there may be given the following: natural or artificial graphite; powder of a metal, such as copper, nickel, iron, or aluminum; powder of a metal oxide, such as titanium oxide, zinc oxide, or tin oxide; and an electro-conductive polymer, such as polyaniline, polypyrrole, or polyacetylene. One kind of those electro-conductive agents may be used alone, or two or more kinds thereof may be used in combination.

The surface layer 3 may contain, for example, a crosslinking agent, a plasticizer, a filler, an extender, a vulcanizing agent, a vulcanizing aid, a crosslinking aid, an antioxidant, an age resistor, a processing aid, or a leveling agent as required, without impairing the effects of the present invention.

When surface roughness is required for the electrophotographic member of the present invention to serve as a developer carrying member, fine particles for controlling roughness (fine particles for roughness control) may be added to the surface layer 3. Fine particles of a polyurethane resin, a polyester resin, a polyether resin, a polyamide resin, an acrylic resin, or a phenol resin may be used as the fine particles for roughness control. The volume-average particle diameter of the fine particles for roughness control is preferably from 3 μm to 20 μm. In addition, the addition amount of the fine particles for roughness control to be added to the surface layer is preferably from 1 part by mass to 100 parts by mass with respect to 100 parts by mass of the resin solid content forming the surface layer.

The thickness of the surface layer 3 is preferably from 1 μm to 100 μm. In addition, a method of forming the surface layer 3 is, for example, spraying with, dipping in, or roll coating with, a paint.

<Electrophotographic Apparatus>

The electrophotographic member according to the present invention can be suitably used as a developer carrying member or a developer regulating member in an electrophotographic apparatus. The electrophotographic member is applicable to any one of the following devices: a noncontact-type developing device and a contact-type developing device each using a magnetic one-component toner or a nonmagnetic one-component toner, and a developing device using a two-component toner.

FIG. 3 is a schematic sectional view for illustrating an example of an electrophotographic apparatus onto which the electrophotographic member according to the present invention has been mounted as the developing roller of a contact-type developing device using a one-component toner. As illustrated in FIG. 3, a developing device 22 is removably mounted onto the electrophotographic apparatus. The developing device 22 includes: a toner container 20 storing a toner 15 as the one-component toner; a developing roller 16; a toner-supplying roller 19 configured to supply the toner to the developing roller 16; and a developing blade 21 configured to regulate the thickness of a toner layer on the developing roller 16. The developing roller is positioned in an opening portion extending in a longitudinal direction in the toner container 20, and is arranged so as to be opposite to a photosensitive member 18. In addition, a process cartridge 17 including the photosensitive member 18, a cleaning blade 26, a waste toner-storing container 25, and a charging roller 24 is removably mounted onto the electrophotographic apparatus. The photosensitive member 18, the cleaning blade 26, the waste toner-storing container 25, and the charging roller may be arranged in the main body of the electrophotographic apparatus.

The printing operation of the electrophotographic apparatus is described below. The photosensitive member 18 is rotated in a direction indicated by the arrow, and is uniformly charged by the charging roller 24 for subjecting the photosensitive member 18 to a charging treatment. Next, an electrostatic latent image is formed on the surface of the photosensitive member 18 by laser light 23 serving as an exposing unit. The toner 15 is applied to the electrostatic latent image by the developing device 22 arranged so as to be in contact with the photosensitive member 18, and hence the image is visualized as a toner image (development). The development is so-called reversal development in which the toner image is formed in an exposed portion. The toner image formed on the photosensitive member 18 is transferred onto paper 34 serving as a recording medium by a transfer roller 29 serving as a transferring member. The paper 34 is fed into the apparatus through a sheet-feeding roller 35 and an adsorption roller 36, and is conveyed into a space between the photosensitive member 18 and the transfer roller 29 by an endless belt-shaped transfer conveyance belt 32. The transfer conveyance belt 32 is operated by a driven roller 33, a driver roller 28, and a tension roller 31. A voltage is applied from a bias power source 30 to the transfer roller 29 and the adsorption roller 36. The paper 34 onto which the toner image has been transferred is subjected to a fixation treatment by a fixing device 27, and is then discharged to the outside of the apparatus. Thus, the printing operation ends. Meanwhile, a transfer residual toner remaining on the photosensitive member 18 without being transferred is scraped off by the cleaning blade 26 serving as a cleaning member for cleaning the surface of the photosensitive member, and is stored in the waste toner-storing container 25. The cleaned photosensitive member 18 repeatedly performs the foregoing printing operation.

<Process Cartridge>

Figure 4:
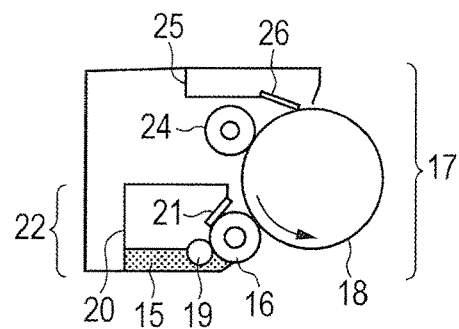
FIG. 4 is a schematic construction view of an example of a process cartridge according to one aspect of the present invention.

The electrophotographic member according to the present invention can be suitably used as each of a developer carrying member, a developer supplying/stripping member, and a developer regulating member in a process cartridge. FIG. 4 is a schematic sectional view of an example of a process cartridge according to one aspect of the present invention. In FIG. 4, the electrophotographic member is mounted as the developing roller 16. The process cartridge 17 illustrated in FIG. 4 is removably mounted onto the main body of an electrophotographic apparatus. In addition, the process cartridge 17 is obtained by integrating: the developing device 22 including the developing roller 16 and the developing blade 21; the electrophotographic photosensitive member 18; the cleaning blade 26; the waste toner-storing container 25; and the charging roller 24. The developing device 22 further includes the toner container 20, and the toner 15 is loaded into the toner container 20. The toner 15 in the toner container 20 is supplied to the surface of the developing roller 16 by the toner-supplying roller 19, and a layer of the toner 15 having a predetermined thickness is formed on the surface of the developing roller 16 by the developing blade 21.

According to one aspect of the present invention, an electrophotographic member that is excellent in charge-imparting performance for a toner, and that hardly causes tackiness on its surface even when placed under a high-temperature and high-humidity environment over a long time period can be obtained. In addition, according to other aspects of the present invention, a process cartridge and an electrophotographic apparatus conducive to stable formation of a high-quality electrophotographic image can be obtained.

Specific examples and comparative examples according to the present invention are described below.

<Synthesis of Polymerizable Monomer>

(Monomer M-1)

n-Decyl methacrylate (monomer M-1) was synthesized as described below.

Following materials were prepared; 31.7 Grams (0.20 mol) of 1-decanol (manufactured by Tokyo Chemical Industry Co., Ltd.) serving as a first raw material, 17.2 g (0.20 mol) of methacrylic acid (manufactured by Kuraray Co., Ltd.) serving as a second raw material, 2.9 g (0.024 mol) of 4-dimethylaminopyridine (DMAP; manufactured by Tokyo Chemical Industry Co., Ltd.) serving as a catalyst, and 46.0 g (0.24 mol) of 1-ethyl-3-(3-dimethylaminopropyl)carbodiimide hydrochloride (WSC; manufactured by Wako Pure Chemical Industries, Ltd.) serving as a condensation agent. Those materials were dissolved in 1.0 L of dry dichloromethane at 0° C., and then the solution was stirred at room temperature overnight. After the completion of the reaction had been confirmed, 0.50 L of a 0.50 M aqueous solution of hydrochloric acid was added to wash the solution, and 0.50 L of a saturated aqueous solution of sodium hydrogen carbonate was added to separate the washed solution. The resultant organic layer was washed with 1.0 L of ion-exchanged water three times, and was dried with anhydrous magnesium sulfate. After that, dichloromethane was distilled off. Thus, n-decyl methacrylate (monomer M-1) was obtained.

(Monomer M-2)

n-Hexadecyl methacrylate (monomer M-2) was obtained in the same manner as in the monomer M-1 except that the first raw material was changed to 48.5 g (0.20 mol) of 1-hexadecanol (manufactured by Tokyo Chemical Industry Co., Ltd.).

<Synthesis of Copolymer>

(Copolymer A-1)

Following materials were loaded into a four-necked separable flask including a stirring machine, a condenser, a temperature gauge, and a nitrogen-introducing tube; 18.8 Grams (0.20 mol) of 1-vinylimidazole (manufactured by Tokyo Chemical Industry Co., Ltd.) serving as a polymerizable monomer providing the constituent unit (1), 50.9 g (0.20 mol) of n-lauryl methacrylate (trade name: "LIGHT ESTER L"; manufactured by Kyoeisha Chemical Co., Ltd.) serving as a polymerizable monomer providing the constituent unit (2), 1.0 L of dry ethanol, and 3.9 g (0.024 mol) of 2,2'-azobisisobutyronitrile (hereinafter sometimes referred to as "AIBN"; manufactured by Tokyo Chemical Industry Co., Ltd.), and the materials were stirred until a system became uniform. While the stirring was continued, a temperature in the reaction system was increased to 70° C., and the mixture was subjected to a reaction for 8 hours in a refluxed state by the introduction of nitrogen. Further, the resultant solution was diluted with ethanol. Thus, a solution of a copolymer A-1 having a solid content of 40 mass % was obtained.

(Copolymers A-2 to A-18 and Copolymers H-1 to H-6)

Solutions of copolymers A-2 to A-18 and copolymers H-1 to H-6 were obtained in the same manner as in the synthesis of the copolymer A-1 except that the polymerizable monomers and their blending amounts were changed to conditions shown in Table 1 and Table 2. In addition, the structures of the respective copolymers are shown in Table 3. In Table 1 and Table 2, the terms "polymerizable monomers (1) to (3)" mean polymerizable monomers providing the constituent units (1) to (3), respectively.

TABLE 1

| Copolymer | Polymerizable monomer (1) Material name | Blending amount (mol %) | Polymerizable monomer (2) Material name | Blending amount (mol %) |
|---|---|---|---|---|
| A-1 | 1-Vinylimidazole (manufactured by Tokyo Chemical Industry Co., Ltd., the same holds true for the following) | 70.0 | n-Lauryl methacrylate (trade name: "LIGHT ESTER L"; manufactured by Kyoeisha Chemical Co., Ltd., the same holds true for the following) | 30.0 |
| A-2 | 1-Vinylimidazole | 98.0 | — | — |
| A-3 | 1-Vinylimidazole | 70.0 | n-Lauryl methacrylate | 29.0 |
| A-4 | 1-Vinylimidazole | 70.0 | n-Decyl methacrylate (monomer M-1) | 30.0 |
| A-5 | 1-Vinylimidazole | 70.0 | n-Hexadecyl methacrylate (monomer M-2) | 30.0 |
| A-6 | 1-Vinylimidazole | 70.0 | n-Stearyl methacrylate (trade name: "LIGHT ESTER S"; manufactured by Kyoeisha Chemical Co., Ltd.) | 30.0 |
| A-7 | 1-Vinylimidazole | 70.0 | Isodecyl methacrylate (trade name: "LIGHT ESTER ID"; manufactured by Kyoeisha Chemical Co., Ltd.) | 30.0 |
| A-8 | 1-Vinylimidazole | 70.0 | Isobornyl methacrylate (trade name: "LIGHT ESTER IBX"; manufactured by Kyoeisha Chemical Co., Ltd.) | 30.0 |
| A-9 | 1-Vinylimidazole | 70.0 | Dicyclopentanyl acrylate (trade name: "FANCRYL FA-513AS"; manufactured by Hitachi Chemical Company, Ltd.) | 30.0 |
| A-10 | 1-Vinylimidazole | 70.0 | n-Lauryl acrylate (trade name: "LIGHT ACRYLATE L-A"; manufactured by Kyoeisha Chemical Co., Ltd.) | 30.0 |
| A-11 | 1-Vinylimidazole | 70.0 | Hexadecyl acrylate (manufactured by Tokyo Chemical Industry Co., Ltd.) | 30.0 |
| A-12 | 1-Vinylimidazole | 42.0 | n-Lauryl methacrylate | 58.0 |
| A-13 | 1-Vinylimidazole | 85.0 | n-Lauryl methacrylate | 15.0 |
| A-14 | 1-Vinylimidazole | 99.0 | n-Lauryl methacrylate | 1.0 |
| A-15 | 4-Vinylpyridine (manufactured by Tokyo Chemical Industry Co., Ltd.) | 90.0 | n-Lauryl methacrylate | 10.0 |
| A-16 | N-Vinylcarbazole (manufactured by Tokyo Chemical Industry Co., Ltd.) | 99.0 | n-Lauryl methacrylate | 1.0 |
| A-17 | 1-Vinylimidazole | 90.0 | — | — |
| A-18 | 1-Vinylimidazole | 99.0 | — | — |

| Copolymer | Polymerizable monomer (3) Material name | Blending amount (mol %) | Nitrogen atom concentration (mass %) |
|---|---|---|---|
| A-1 | — | — | 13.8 |
| A-2 | Silicone oil (trade name: "KF-2012"; manufactured by Shin-Etsu Chemical Co., Ltd.) | 2.0 | 14.9 |
| A-3 | Silicone oil (trade name: "KF-2012"; manufactured by Shin-Etsu Chemical Co., Ltd.) | 1.0 | 10.6 |
| A-4 | — | — | 14.7 |
| A-5 | — | — | 12.3 |
| A-6 | — | — | 11.7 |
| A-7 | — | — | 14.7 |
| A-8 | — | — | 14.8 |
| A-9 | — | — | 15.3 |
| A-10 | — | — | 14.2 |
| A-11 | — | — | 12.7 |
| A-12 | — | — | 6.3 |
| A-13 | — | — | 20.2 |
| A-14 | — | — | 29.0 |
| A-15 | — | — | 10.5 |
| A-16 | — | — | 7.2 |

TABLE 1-continued

| | | | | |
|---|---|---|---|---|
| A-17 | Silicone oil (trade name: "X-22-174ASX"; manufactured by Shin-Etsu Chemical Co., Ltd.) | | 10.0 | 14.4 |
| A-18 | Silicone oil (trade name: "X-22-2426"; manufactured by Shin-Etsu Chemical Co., Ltd.) | | 1.0 | 13.0 |

TABLE 2

| | Polymerizable monomer (1) | | Polymerizable monomer (2) | |
|---|---|---|---|---|
| Copolymer | Material name | Blending amount (mol %) | Material name | Blending amount (mol %) |
| H-1 | 1-Vinyl-1,2,4-triazole (manufactured by Santa Cruz Biotechnology, Inc.) | 95.0 | n-Lauryl methacrylate (trade name: "LIGHT ESTER L"; manufactured by Kyoeisha Chemical Co., Ltd., the same holds true for the following) | 5.0 |
| H-2 | 1-Vinylimidazole (manufactured by Tokyo Chemical Industry Co., Ltd.) | 15.0 | Methyl methacrylate (manufactured by Kuraray Co., Ltd.) | 85.0 |
| H-3 | Dimethylaminoethyl methacrylate (manufactured by Tokyo Chemical Industry Co., Ltd.) | 95.0 | n-Lauryl methacrylate | 5.0 |
| H-4 | 1-Allylpiperidine (manufactured by Wako Pure Chemical Industries, Ltd.) | 90.0 | n-Lauryl methacrylate | 10.0 |
| H-5 | Dimethylaminoethylmethyl methacrylate chloride (manufactured by Mitsubishi Rayon Co., Ltd.) | 99.0 | n-Lauryl methacrylate | 1.0 |
| H-6 | 1-Allylpyridinium bromide (Manufactured by Suzhou Yacoo Chemical Reagent Co., Ltd.) | 99.0 | n-Lauryl methacrylate | 1.0 |

| | Polymerizable monomer (3) | | |
|---|---|---|---|
| Copolymer | Material name | Blending amount (mol %) | Nitrogen atom concentration (mass %) |
| H-1 | — | — | 38.7 |
| H-2 | — | — | 4.2 |
| H-3 | — | — | 8.2 |
| H-4 | — | — | 9.1 |
| H-5 | — | — | 6.7 |
| H-6 | — | — | 6.9 |

TABLE 3

| Copolymer | Incorporated constituent unit | (1) R$_1$ | (1) X | (2) R$_2$ | (2) Y |
|---|---|---|---|---|---|
| A-1 | (1) (2) | —H | (X-1) | —CH$_3$ | —COO—(CH$_2$)$_{11}$CH$_3$ |
| A-2 | (1) (3) | —H | (X-1) | — | — |
| A-3 | (1) (2) (3) | —H | (X-1) | —CH$_3$ | —COO—(CH$_2$)$_{11}$CH$_3$ |
| A-4 | (1) (2) | —H | (X-1) | —CH$_3$ | —COO—(CH$_2$)$_9$CH$_3$ |
| A-5 | (1) (2) | —H | (X-1) | —CH$_3$ | —COO—(CH$_2$)$_{15}$CH$_3$ |
| A-6 | (1) (2) | —H | (X-1) | —CH$_3$ | —COO—(CH$_2$)$_{17}$CH$_3$ |
| A-7 | (1) (2) | —H | (X-1) | —CH$_3$ | —COO—(CH$_2$CH(CH$_3$)CH$_2$CH(CH$_3$)CH$_2$CH(CH$_3$)$_2$ |
| A-8 | (1) (2) | —H | (X-1) | —CH$_3$ | (Y-1) |
| A-9 | (1) (2) | —H | (X-1) | —H | (Y-2) |
| A-10 | (1) (2) | —H | (X-1) | —H | —COO—(CH$_2$)$_{11}$CH$_3$ |
| A-11 | (1) (2) | —H | (X-1) | —H | —COO—(CH$_2$)$_{15}$CH$_3$ |
| A-12 | (1) (2) | —H | (X-1) | —CH$_3$ | —COO—(CH$_2$)$_{11}$CH$_3$ |
| A-13 | (1) (2) | —H | (X-1) | —CH$_3$ | —COO—(CH$_2$)$_{11}$CH$_3$ |
| A-14 | (1) (2) | —H | (X-1) | —CH$_3$ | —COO—(CH$_2$)$_{11}$CH$_3$ |
| A-15 | (1) (2) | —H | (X-2) | —CH$_3$ | —COO—(CH$_2$)$_{11}$CH$_3$ |

TABLE 3-continued

| | | | | | | |
|---|---|---|---|---|---|---|
| A-16 | (1) (2) | —H | (X-3) | —CH$_3$ | —COO—(CH$_2$)$_{11}$CH$_3$ | |
| A-17 | (1) (3) | —H | (X-1) | — | — | |
| A-18 | (1) (3) | —H | (X-1) | — | — | |
| H-1 | (1) (2) | —H | (X-4) | —CH$_3$ | —COO—(CH$_2$)$_{11}$CH$_3$ | |
| H-2 | (1) (2) | —H | (X-1) | —CH$_3$ | —COO—CH$_3$ | |
| H-3 | (1) (2) | —CH$_3$ | (X-5) | —CH$_3$ | —COO—(CH$_2$)$_{11}$CH$_3$ | |
| H-4 | (1) (2) | —H | (X-6) | —CH$_3$ | —COO—(CH$_2$)$_{11}$CH$_3$ | |
| H-5 | (1) (2) | —CH$_3$ | (X-7) | —CH$_3$ | —COO—(CH$_2$)$_{11}$CH$_3$ | |
| H-6 | (1) (2) | —H | (X-8) | —CH$_3$ | —COO—(CH$_2$)$_{11}$CH$_3$ | |

| Copolymer | R3 | Z (3) |
|---|---|---|
| A-1 | — | — |
| A-2 | —CH$_3$ | —COO—Si(CH$_3$)$_2$—(O—Si(CH$_3$)$_2$—)$_n$—O—Si(CH$_3$)$_2$—R |
| A-3 | —CH$_3$ | —COO—Si(CH$_3$)$_2$—(O—Si(CH$_3$)$_2$—)$_n$—O—Si(CH$_3$)$_2$—R |
| A-4 | — | — |
| A-5 | — | — |
| A-6 | — | — |
| A-7 | — | — |
| A-8 | — | — |
| A-9 | — | — |
| A-10 | — | — |
| A-11 | — | — |
| A-12 | — | — |
| A-13 | — | — |
| A-14 | — | — |
| A-15 | — | — |
| A-16 | — | — |
| A-17 | —CH$_3$ | —COO—Si(CH$_3$)$_2$—(O—Si(CH$_3$)$_2$—)$_n$—O—Si(CH$_3$)$_2$—R |
| A-18 | —CH$_3$ | —COO—Si(CH$_3$)$_2$—(O—Si(CH$_3$)$_2$—)$_n$—O—Si(CH$_3$)$_2$—R |
| H-1 | — | — |
| H-2 | — | — |
| H-3 | — | — |
| H-4 | — | — |
| H-5 | — | — |
| H-6 | — | — |

In Table 3, (X-1) to (X-8), and (Y-1) and (Y-2) represent the following structures. In addition, R represents an organic group.

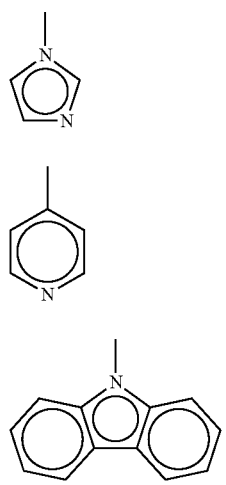

(X-1)

(X-2)

(X-3)

(X-4)

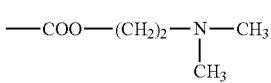

(X-5)

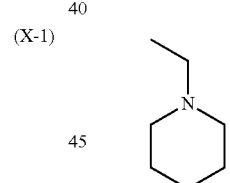

(X-6)

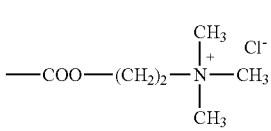

(X-7)

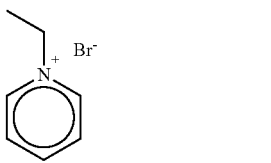

(X-8)

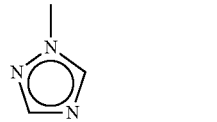

(Y-1)

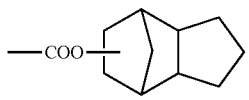

(Y-2)

In addition, the weight-average molecular weight of each of the copolymers A-1 to A-18 and the copolymers H-1 to H-6 was measured. As a measurement method, the weight-average molecular weight Mw was measured by using a method of measuring a molecular weight distribution based on gel permeation chromatography (GPC) under the following conditions.

First, columns were stabilized in a heat chamber at a temperature of 40° C., and toluene was flowed as a solvent at a flow rate of 1 mL/min in each of the columns at the temperature. The measurement is performed by injecting, as a sample, 100 μL of an ethanol solution of each of the copolymers in which the concentration of the copolymer has been adjusted to 0.5 mass %. At the time of the molecular weight measurement, the molecular weight distribution of the sample is calculated from a relationship between the logarithmic value of a calibration curve produced with several kinds of monodisperse polystyrene standard samples (trade names: TSKgel Standard Polystyrenes "0005202" to "0005211", manufactured by Tosoh Corporation) and a retention time.

In addition, a GPC gel permeation chromatograph analyzer (trade name: HLC8220, manufactured by Tosoh Corporation) was used as a GPC apparatus, and a differential refractive index detector (trade name: RI-8020, manufactured by Tosoh Corporation) was used as a detector. In addition, a combination of three commercial polystyrene gel columns (trade name: Shodex GPC LF-804, manufactured by Showa Denko K.K.) was used as the columns.

The Mw of each of the copolymers is shown in Table 4 below.

TABLE 4

| Copolymer No. | Mw |
|---|---|
| A-1 | 14,200 |
| A-2 | 18,400 |
| A-3 | 18,500 |
| A-4 | 13,300 |
| A-5 | 15,900 |
| A-6 | 16,700 |
| A-7 | 13,300 |
| A-8 | 13,200 |
| A-9 | 12,700 |
| A-10 | 13,800 |
| A-11 | 15,400 |
| A-12 | 18,700 |

TABLE 4-continued

| Copolymer No. | Mw |
|---|---|
| A-13 | 11,800 |
| A-14 | 9,500 |
| A-15 | 12,000 |
| A-16 | 19,300 |
| A-17 | 17,400 |
| A-18 | 21,300 |
| H-1 | 13,000 |
| H-2 | 9,900 |
| H-3 | 16,200 |
| H-4 | 13,800 |
| H-5 | 20,800 |
| H-6 | 20,000 |

<Preparation of Dispersion Liquid for Forming Surface Layer>

(Dispersion Liquid B-1 for Forming Surface Layer)

100.0 Parts by mass of polyoxytetramethylene glycol (trade name: "PTGL-3500"; manufactured by Hodogaya Chemical Co., Ltd.), 82.5 parts by mass of a modified polyisocyanate (trade name: "CORONATE 2521"; manufactured by Tosoh Corporation), and 43.7 parts by mass of carbon black (trade name: "MA230"; manufactured by Mitsubishi Chemical Corporation) were stirred and mixed, and the mixture was dissolved and mixed in methyl ethyl ketone (MEK) so that a total solid content ratio became 30 mass %, followed by uniform dispersion with a sand mill. Further, the viscosity of the resultant was adjusted to from 10 cps to 12 cps with MEK. Thus, a dispersion liquid B-1 for forming a surface layer was obtained.

(Dispersion Liquids B-2 to B-7 for forming Surface Layers)

Dispersion liquids B-2 to B-7 for forming surface layers were obtained in the same manner as in the preparation of the dispersion liquid B-1 for forming a surface layer except that the polyol, the isocyanate, and the filler, and their blending amounts were changed to conditions shown in Table 5.

TABLE 5

| | Polyol | | Isocyanate | | Filler | |
|---|---|---|---|---|---|---|
| Dispersion liquid | Material name | Part(s) by mass | Material name | Part(s) by mass | Material name | Part(s) by mass |
| B-1 | Polyoxytetramethylene glycol (trade name: PTGL-3500, manufactured by Hodogaya Chemical Co., Ltd.) | 100.0 | Modified polyisocyanate (trade name: CORONATE 2521, manufactured by Tosoh Corporation, the same holds true for the following) | 82.5 | Carbon black (trade name: MA230, manufactured by Mitsubishi Chemical Corporation, the same holds true for the following) | 43.7 |

TABLE 5-continued

| | Polyol | | Isocyanate | | Filler | |
|---|---|---|---|---|---|---|
| Dispersion liquid | Material name | Part(s) by mass | Material name | Part(s) by mass | Material name | Part(s) by mass |
| B-2 | Acrylic polyol (trade name: ACRYDIC A-848RN, manufactured by DIC Corporation) | 100.0 | Polyisocyanate (trade name: CORONATE L, manufactured by Tosoh Corporation, the same holds true for the following) | 12.1 | Carbon black | 16.7 |
| B-3 | Polyoxypropylene glycol (trade name: SANNIX PP-3000, manufactured by Sanyo Chemical Industries, Ltd.) | 100.0 | Modified polyisocyanate | 82.5 | Carbon black | 43.7 |
| B-4 | Polyoxytetramethylene glycol (trade name: PTMG-3000, manufactured by Sanyo Chemical Industries, Ltd.) | 100.0 | Modified polyisocyanate | 82.5 | Carbon black | 43.7 |
| B-5 | Polyester polyol (trade name: P-3050, manufactured by Kuraray Co., Ltd.) | 100.0 | Polyisocyanate | 24.2 | Carbon black | 24.5 |
| B-6 | Polycarbonate polyol (trade name: P-3090, manufactured by Kuraray Co., Ltd.) | 100.0 | Polyisocyanate | 45.2 | Carbon black | 26.5 |
| B-7 | Polybutadiene polyol (trade name: G-3000, manufactured by Nippon Soda Co., Ltd.) | 100.0 | Polyisocyanate | 24.2 | Carbon black | 33.5 |

EXAMPLE 1

<Production of Electrophotographic Roller>
(Preparation of Substrate)

A product obtained by applying and baking a primer (trade name: "DY35-051"; manufactured by Dow Corning Toray Co., Ltd.) on a cored bar made of stainless steel (SUS304) and having a diameter of 6 mm was prepared as the substrate 2.

(Formation of Silicone Rubber Elastic Layer)

The prepared substrate was placed in a die, and an addition-type silicone rubber composition obtained by mixing 100.0 parts by mass of a liquid silicone rubber material (trade name: "SE6724A/B"; manufactured by Dow Corning Toray Co., Ltd.), 15.0 parts by mass of carbon black (trade name: "TOKA BLACK #4300"; manufactured by Tokai Carbon Co., Ltd.), and 0.1 part by mass of a platinum catalyst was injected into a cavity formed in the die. Subsequently, the die was heated, and the silicone rubber was vulcanized at a temperature of 150° C. for 15 minutes to be cured. The substrate having the cured silicone rubber layer formed on its peripheral surface was removed from the die, and then the curing reaction of the silicone rubber layer was completed by further heating the cored bar at a temperature of 180° C. for 1 hour. Thus, an elastic roller R-1 in which the silicone rubber elastic layer 4 having a diameter of 12 mm was formed on the outer periphery of the substrate 2 was produced.

(Formation of Surface Layer)

A paint for forming a surface layer of Example 1 was prepared by adding, to the dispersion liquid B-1 for forming a surface layer prepared in advance, the solution of the copolymer A-1 so that the amount of the copolymer became 1.0 part by mass with respect to the solid content of the resin component of the B-1 at the time of film formation. The paint was stirred overnight so that the solution did not volatilize, and then the produced elastic roller R-1 was subjected to dip coating with the paint. Thus, a coating film of the paint was formed on the surface of the elastic layer of the elastic roller, and the coating film was dried. Further, the paint was subjected to a heat treatment at a temperature of 150° C. for 1 hour to be cured. Thus, an electrophotographic roller G-1 in which the surface layer (resin layer) 3 having a thickness of about 15 μm was arranged on the outer periphery of the elastic layer 4 was produced.

In addition, 2.0 g of the paint was applied onto a stainless steel (SUS304) plate with a bar coater (#120) to form a coating film, and then the coating film was dried at an air temperature of 23° C. for 24 hours. After that, heat curing was performed under the same conditions as the above-mentioned coating film curing conditions. Thus, a test piece C-1 for measuring a triboelectric charge quantity corresponding to Example 1 was produced.

Further, the paint was cast in an aluminum die so as to have a thickness of 200 μm. The die was mounted on a sunflower cradle (trade name: "WONDER SHAKER NA-4X"; manufactured by Nisshin Rika Co., Ltd.), and the paint was dried until its flowability was lost. After that, the die was mounted on a horizontal table, and the paint was dried at an air temperature of 23° C. for 24 hours. Then, heat curing was performed under the same conditions as the above-mentioned coating film curing conditions. The resultant was cooled to room temperature, and was then peeled from the die. Thus, a urethane resin sheet D-1 was produced as a test piece for measuring a tack value corresponding to Example 1.

<Component Analysis of Surface Layer>

The presence of the copolymer in the surface layer of the electrophotographic roller G-1 according to Example 1 was confirmed by the following method.

A fragment measuring 5 mm long by 5 mm wide, the fragment including the total thickness of the surface layer and the elastic layer, was cut out of the surface of the electrophotographic roller G-1. The fragment was embedded with an embedding resin "Epok 812 Set" (trade name). A sample slice S-1 having a thickness of 0.1 μm in a direction from the surface of the surface layer toward the elastic layer was cut out of the fragment embedded with the resin by using an ultramicrotome (trade name: "LEICA EM UCT"; manufactured by Leica Microsystems) mounted with a diamond knife (trade name: "DiATOMECRYODRY"; manufactured by DiATOME) and a cryogenic system (trade name: "LEICA EM FCS"; manufactured by Leica Microsystems). Next, a portion in the sample slice S-1 corresponding to a section of the surface layer was analyzed with a time-of-flight secondary ion mass spectrometer (TOF-SIMS, trade name: "TRIFT IV"; ULVAC-PHI, Inc.). An amino group derived from a nitrogen atom in the structural formula (1) was confirmed from a fragment group obtained by the analysis. It was confirmed that the copolymer of the present invention was present in a region from the surface of the electrophotographic roller G-1 to a depth of up to 0.1 µm.

Further, the embedding resin was removed from the sample slice S-1 subjected to the TOF-SIMS analysis, and the residue was dipped in methyl ethyl ketone for 48 hours. The number-average molecular weight Mn of the resultant extracted component was measured by the same method as the method described in the foregoing, and it was confirmed that the extracted component was the copolymer according to the present invention. Next, it was confirmed that the extracted component had the structure shown in Table 3 by subjecting the extracted component to pyrolysis measurement and NMR measurement. Further, a nitrogen content in the copolymer was measured by subjecting the extracted component to elemental analysis, and it was confirmed that the nitrogen content coincided with the nitrogen atom concentration shown in Table 1.

The elemental analysis was performed as described below. A sample was obtained by thinly applying the extracted component onto a glass plate and air-drying the extracted component at room temperature for 1 day. The nitrogen content was measured by subjecting the sample to CHN elemental analysis with CHN CORDER MODEL MT-3 manufactured by Yanagimoto Seisakusho.

<Performance Evaluations of Electrophotographic Roller>

The performances (charge-imparting performance for a toner and the tackiness of the surface) of the electrophotographic roller thus obtained were subjected to the following evaluations. The results of the evaluations are shown in Table 5.

[Evaluation (1): Measurement of Triboelectric Charge Quantity]

After the test piece had been left to stand under an environment having a temperature of 40° C. and a relative humidity of 95% for 6 hours or more, the triboelectric charge quantity of the test piece was measured in accordance with the following procedure.

A cascade-type surface charge quantity-measuring apparatus TS-100AT (trade name, manufactured by Kyocera Chemical Corporation) was used in the measurement of the triboelectric charge quantity of the test piece. Standard Carrier N-01 (The Imaging Society of Japan) was used as a carrier. The falling time of the carrier was set to 10 seconds, and the total charge quantity of the carrier that had fallen into a saucer placed on an insulating plate was measured with a potentiometer connected in parallel to a capacitor and defined as a charge quantity Q (µC). Further, the mass (g) of the carrier that had fallen into the saucer was measured, and a charge quantity Q/M per unit mass (µC/g) calculated from these values was defined as the triboelectric charge quantity of the test piece. As the absolute value of the charge quantity Q/M of a material for a surface layer becomes larger, an electrophotographic member having higher charge-imparting performance (triboelectric charge-imparting performance) can be obtained.

[Evaluation (2): Measurement of Tack Value]

A tacking tester (model: TAC-II, (manufactured by Rhesca Co., Ltd.)) was used as an apparatus for measuring a tack value. With regard to a measurement sample, the urethane resin sheet D-1 was used as the test piece for measuring a tack value. After having been left at rest under an environment having a temperature of 40° C. and a relative humidity of 95% for 24 hours, the produced urethane resin sheet was subjected to measurement under the following conditions. The measurement was performed three times, and the average of the measured values was defined as a tack value. As the tack value thus obtained becomes lower, the stickiness (tackiness) of the surface of an electrophotographic member reduces, and hence the sticking of a toner to the surface can be suppressed. The toner sticking refers to, for example, the following phenomenon: when the electrophotographic member serving as a developer carrying member is left to stand under a high-temperature and high-humidity environment for a long time period, the toner sticks to the surface of the developer carrying member.

| | |
|---|---|
| Measurement contact portion: | A probe made of stainless steel having a diameter of 5 mm |
| Load sensor: | LT25A-100 |
| Approaching speed at the time of contact: | 30 mm/min |
| Lifting speed at the time of the test: | 600 mm/min |
| Load at the time of contact: | 60 gf |
| Contact rest time: | 5 seconds |
| Measurement environment: | An environment having a temperature of 40° C. and a relative humidity of 95% |

[Evaluation (3): Measurement of Initial Sticking Concentration]

The initial sticking concentration of a toner was evaluated by the following method.

The electrophotographic roller G-1 was mounted as a developing roller onto a yellow toner cartridge for a laser printer (trade name: "LBP5300"; manufactured by Canon Inc.). The yellow toner cartridge was loaded into the laser printer. Then, the output operation of a white solid image was performed with the laser printer, and a state in which the surface of the developing roller was coated with a yellow toner was established. The developing roller in such state was removed from the yellow toner cartridge.

The removed electrophotographic roller G-1 was mounted on a flat plate made of polytetrafluoroethylene. The electrophotographic roller G-1 was brought into press contact with the flat plate at a load of 300 gf (a load of 150 gf on each of both ends of the mandrel), and was left to stand under an environment having a temperature of 40° C. and a relative humidity of 95% for 3 months. Next, the developing roller was released from the state of being brought into press contact with the flat plate, and was left at rest under an environment having a temperature of 25° C. and a relative humidity of 45% for 3 hours. After that, the surface of the electrophotographic roller G-1 was subjected to air blowing.

Next, the toner sticking onto the electrophotographic roller G-1 was peeled with an adhesive tape. The adhesive tape having adhered thereto the yellow toner was placed on plain paper, and its reflection density was measured with a reflection densitometer (trade name: "TC-6DS/A"; manufactured by Tokyo Denshoku Co., Ltd.). In addition, as a control, an adhesive tape having adhered thereto no toner was similarly placed on plain paper, and its reflection density was similarly measured. Then, the reduction amount (%) of a reflectance was calculated with reference to the reflection density of the adhesive tape having adhered thereto no toner. The measurement was performed at a total of three points, i.e., the central portion and both end portions of the developing roller, and the arithmetic average of the measured values was defined as the initial sticking concentration of the toner in the electrophotographic roller G-1 to be evaluated. As the initial sticking concentration becomes lower, it can be said that the sticking of the toner to the surface of the electrophotographic roller G-1 can be suppressed to a larger extent.

[Evaluation (4): Q/M Measurement]

In order for the charge-imparting performance of the electrophotographic roller for a developer to be evaluated, Q/M measurement was performed. Under an environment having a temperature of 40° C. and a relative humidity of 95%, the electrophotographic roller G-1 was mounted as a developing roller onto a black toner cartridge for a laser printer (trade name: "LBP5300"; manufactured by Canon Inc.). After having been left to stand under the environment having a temperature of 40° C. and a relative humidity of 95% for 3 months, the black toner cartridge was loaded into the laser printer under the same environment. Then, while the environment was maintained, the output operation of a white solid image was performed with the laser printer, and a state in which the surface of the developing roller was coated with a black toner was established. The developing roller in such state was removed from the black toner cartridge.

Next, under the environment having a temperature of 40° C. and a relative humidity of 95%, the developer carried on the electrophotographic roller G-1 was sucked and collected with a metal cylindrical tube and a cylindrical filter. At that time, a quantity Q (μC) of charge stored in a capacitor through the metal cylindrical tube, and a mass M (g) of the sucked developer were measured. A charge quantity Q/M per unit mass (μC/g) was calculated from those values. When a negatively chargeable developer is used, the sign of the Q/M is negative. Accordingly, as the absolute value of the Q/M becomes larger, it can be said that the charge-imparting performance (triboelectric charge-imparting performance) of the electrophotographic roller for the developer becomes higher.

[Evaluation (5): Fogging Measurement]

Fogging measurement was performed simultaneously with the evaluation (4). Under the environment having a temperature of 40° C. and a relative humidity of 95%, the printer was stopped during the output of the white solid image. At this time, the developer adhering onto a photosensitive member was peeled with a tape, and the reduction amount (%) of a reflectance with respect to a reference was measured with a reflection densitometer (trade name: "TC-6DS/A"; manufactured by Tokyo Denshoku Co., Ltd.) and defined as a fogging value. The reduction of the reflectance results from the fact that a toner is transferred onto the white background portion of paper that is originally intended to serve as a blank dot without undergoing the printing of the image. Therefore, the fogging value is preferably as small as possible.

[Evaluation (6): Confirmation of Presence or Absence of Occurrence of Regulation Failure]

The printer and the cartridge used in the evaluation (5) were aged under an environment having a temperature of 15° C. and a relative humidity of 10% for 1 day. After that, a white solid image was output, and the presence or absence of the occurrence of a regulation failure was confirmed. The regulation failure may occur when a toner is excessively charged. The occurrence of the regulation failure may cause an image defect, such as the occurrence of dot-like unevenness in a non-printed portion or the occurrence of a toner aggregate on an image.

EXAMPLES 2 to 48 AND COMPARATIVE EXAMPLES 1 TO 6

Electrophotographic rollers of Examples 2 to 48 and Comparative Examples 1 to 6 were each produced by the same production method as that of Example 1 except that the copolymer and the dispersion liquid for forming a surface layer were changed as shown in Table 6. Then, in each of the examples and the comparative examples, in the same manner as in Example 1, it was confirmed that the copolymer was present in a region from the surface of the electrophotographic roller to a depth of up to 0.1 μm. In addition, the structures and nitrogen atom concentrations of the copolymers were identified.

Further, test pieces for measuring various physical properties were produced in the same manner as in Example 1. Various evaluations were performed in the same manner as in Example 1 by using the electrophotographic rollers and the test pieces according to the respective examples and comparative examples.

TABLE 6

| | Copolymer | Dispersion liquid | Evaluation (1) Q/M (μC/g) | Evaluation (2) Tack value (gf) | Evaluation (3) Initial sticking concentration (reduction amount of reflectance) (%) | Evaluation (4) Q/M (μC/g) | Evaluation (5) Fogging (%) | Evaluation (6) Regulation failure |
|---|---|---|---|---|---|---|---|---|
| Example 1 | A-1 | B-1 | −4.0 | 51 | 1.3 | −41 | 1.0 | Absent |
| Example 2 | A-2 | | −4.2 | 31 | 0.6 | −43 | 1.1 | |
| Example 3 | A-3 | | −4.1 | 35 | 0.7 | −42 | 1.1 | |
| Example 4 | A-4 | | −4.0 | 49 | 1.1 | −41 | 1.0 | |
| Example 5 | A-5 | | −4.0 | 50 | 1.1 | −41 | 1.1 | |
| Example 6 | A-6 | | −3.9 | 43 | 0.8 | −40 | 1.2 | |
| Example 7 | A-7 | | −3.9 | 45 | 0.7 | −40 | 1.1 | |
| Example 8 | A-8 | | −3.8 | 43 | 0.8 | −39 | 1.2 | |
| Example 9 | A-9 | | −3.9 | 42 | 0.6 | −41 | 1.2 | |
| Example 10 | A-10 | | −3.8 | 53 | 1.3 | −40 | 1.1 | |
| Example 11 | A-11 | | −3.9 | 47 | 1.2 | −40 | 1.2 | |
| Example 12 | A-12 | | −3.5 | 53 | 1.4 | −34 | 1.5 | |
| Example 13 | A-13 | | −4.4 | 43 | 1.0 | −45 | 1.0 | |
| Example 14 | A-14 | | −4.5 | 41 | 0.9 | −46 | 0.8 | |
| Example 15 | A-15 | | −3.8 | 46 | 1.2 | −37 | 1.1 | |
| Example 16 | A-16 | | −3.7 | 42 | 1.3 | −35 | 1.4 | |

TABLE 6-continued

| | Copolymer | Dispersion liquid | Evaluation (1) Q/M (μC/g) | Evaluation (2) Tack value (gf) | Evaluation (3) Initial sticking concentration (reduction amount of reflectance) (%) | Evaluation (4) Q/M (μC/g) | Evaluation (5) Fogging (%) | Evaluation (6) Regulation failure |
|---|---|---|---|---|---|---|---|---|
| Example 17 | A-17 | | −4.1 | 31 | 0.6 | −41 | 1.1 | |
| Example 18 | A-18 | | −3.8 | 32 | 0.5 | −39 | 1.2 | |
| Example 19 | A-1 | B-2 | −3.7 | 47 | 1.3 | −37 | 1.3 | |
| Example 20 | A-2 | | −3.9 | 27 | 0.4 | −40 | 1.2 | |
| Example 21 | A-3 | | −3.8 | 31 | 0.6 | −38 | 1.2 | |
| Example 22 | A-4 | | −3.7 | 45 | 0.8 | −38 | 1.2 | |
| Example 23 | A-6 | | −3.6 | 39 | 0.7 | −36 | 1.3 | |
| Example 24 | A-1 | B-3 | −3.9 | 49 | 1.1 | −40 | 1.1 | |
| Example 25 | A-2 | | −4.1 | 29 | 0.5 | −42 | 1.2 | |
| Example 26 | A-3 | | −4.0 | 33 | 0.6 | −41 | 1.1 | |
| Example 27 | A-4 | | −3.9 | 47 | 1.2 | −41 | 1.3 | |
| Example 28 | A-6 | | −3.8 | 43 | 1.3 | −38 | 1.3 | |
| Example 29 | A-1 | B-4 | −4.0 | 48 | 1.4 | −41 | 1.1 | |
| Example 30 | A-2 | | −4.2 | 30 | 0.6 | −43 | 1.0 | |
| Example 31 | A-3 | | −4.1 | 34 | 0.6 | −41 | 1.1 | |
| Example 32 | A-4 | | −4.0 | 46 | 1.0 | −40 | 1.2 | |
| Example 33 | A-6 | | −3.9 | 42 | 0.9 | −40 | 1.2 | |
| Example 34 | A-1 | B-5 | −3.8 | 50 | 1.3 | −39 | 1.2 | |
| Example 35 | A-2 | | −4.0 | 30 | 0.7 | −41 | 1.1 | |
| Example 36 | A-3 | | −3.7 | 34 | 0.7 | −37 | 1.3 | |
| Example 37 | A-4 | | −3.8 | 48 | 1.1 | −38 | 1.2 | |
| Example 38 | A-6 | | −3.7 | 42 | 0.8 | −38 | 1.2 | |
| Example 39 | A-1 | B-6 | −3.8 | 48 | 1.3 | −39 | 1.1 | |
| Example 40 | A-2 | | −4.0 | 28 | 0.4 | −41 | 1.0 | |
| Example 41 | A-3 | | −3.9 | 32 | 0.6 | −39 | 1.3 | |
| Example 42 | A-4 | | −3.8 | 46 | 0.9 | −38 | 1.2 | |
| Example 43 | A-6 | | −3.7 | 40 | 0.7 | −37 | 1.3 | |
| Example 44 | A-1 | B-7 | −3.6 | 51 | 1.4 | −36 | 1.4 | |
| Example 45 | A-2 | | −3.8 | 31 | 0.7 | −37 | 1.4 | |
| Example 46 | A-3 | | −3.7 | 35 | 0.7 | −36 | 1.5 | |
| Example 47 | A-4 | | −3.6 | 49 | 1.1 | −35 | 1.4 | |
| Example 48 | A-6 | | −3.5 | 43 | 0.8 | −34 | 1.5 | |
| Comparative Example 1 | H-1 | B-1 | −6.9 | 24 | 0.5 | −68 | 0.4 | Present |
| Comparative Example 2 | H-2 | | −2.0 | 77 | 4.1 | −17 | 5.1 | Absent |
| Comparative Example 3 | H-3 | | −2.6 | 88 | 5.4 | −25 | 3.5 | |
| Comparative Example 4 | H-4 | | −2.5 | 45 | 1.1 | −24 | 4.6 | |
| Comparative Example 5 | H-5 | | −2.1 | 86 | 5.2 | −20 | 3.4 | |
| Comparative Example 6 | H-6 | | −2.0 | 84 | 4.4 | −19 | 3.9 | |

In each of Examples 1 to 48, the Q/M of the material for a surface layer was satisfactory, and the tack value was relatively low. It is assumed that because of the foregoing, also in the evaluations of the corresponding developing roller, the following results were obtained: the initial sticking concentration was low, the Q/M was satisfactory, the fogging was low, and the regulation failure did not occur. It is found from the foregoing results that both the charge-imparting performance and fogging performance are satisfactorily achieved.

Here, attention is paid to Examples 1 to 18 in each of which the dispersion liquid B-1 containing, as a binder resin, the polyurethane resin prepared by using the polyoxytetramethylene glycol and the modified polyisocyanate was used. Even when the alkyl structure (constituent unit (2)) was changed, no significant difference was observed in each performance (Examples 1 and 4 to 11). Meanwhile, the incorporation of the silicone structure (constituent unit (3)) into the copolymer was found to further reduce the tackiness and to reduce the initial sticking concentration (Examples 2, 3, 17, and 18). No significant change in performance by the molecular weight of the silicone structure was observed. In addition, it was confirmed that the structure did not have any particular adverse effect on the triboelectric charge-imparting performance.

When the concentration of the nitrogen atom derived from the nitrogen-containing aromatic heterocyclic amine structure in the copolymer was increased within the range of from 6.0 mass % to 30.0 mass %, an increase in QM and a reduction in tack value were observed (Examples 12 to 14). However, the concentration of the nitrogen atom derived from the nitrogen-containing aromatic heterocyclic amine structure fell within the range of from 6.0 mass % to 30.0 mass %, and hence the worsening of the fogging or the deterioration of the initial sticking performance in association with a remarkable reduction in triboelectric charge-imparting performance, or the occurrence of the regulation failure due to excessive triboelectric charge-imparting performance was not observed.

When the nitrogen-containing aromatic heterocyclic amine structure (constituent unit (1)) was changed, with regard to the triboelectric charge-imparting performance, a result corresponding to the concentration of the nitrogen atom derived from the nitrogen-containing aromatic heterocyclic amine structure was observed (Examples 15 and 16). In addition, no significant difference in initial sticking performance was observed between the examples.

Even in each of the cases where the dispersion liquids B-2 to B-7 in which the composition of the polyurethane resin was changed were used, substantially the same tendency as that in the case where the dispersion liquid B-1 was used was observed (Examples 19 to 48).

In Comparative Example 1, the concentration of the nitrogen atom derived from the nitrogen-containing aromatic heterocyclic amine structure is high. Accordingly, although the tack value of the surface layer is low, the Q/M is excessive. It is assumed that because of the foregoing, the corresponding developing roller involved no problem in terms of initial sticking, but caused the occurrence of the regulation failure under a low-temperature and low-humidity environment having, for example, a temperature of 15° C. and a relative humidity of 10% RH.

In addition, in Comparative Example 2, the concentration of the nitrogen atom derived from the nitrogen-containing aromatic heterocyclic amine structure deviates from the range of from 6.0 mass % to 30.0 mass % toward lower values. Accordingly, the tack value of the material for a surface layer increases and the Q/M becomes deficient. It is assumed that because of the foregoing, the corresponding developing roller was poor in initial sticking performance and caused the worsening of the fogging.

In each of Comparative Example 3 and Comparative Example 5, a copolymer free of any aromatic ring structure was used. Accordingly, an increase in tack value of the material for a surface layer occurred, and the increase was assumed to cause an increase in initial sticking concentration of the corresponding developing roller.

A ring structure is present in the copolymer used in Comparative Example 4, but the ring structure does not have aromaticity. It is assumed that because of the foregoing, the triboelectric charge-imparting performance was relatively low and the fogging performance of the corresponding developing roller was insufficient.

Further, in Comparative Example 6, the copolymer does not have any nitrogen-containing aromatic heterocyclic amine structure in itself and has an ionic structure. Accordingly, the affinity of the surface of the surface layer for water is improved. The improvement was assumed to cause an increase in tack value of the surface of the surface layer and an increase in initial sticking concentration of the developing roller under the high-temperature and high-humidity environment.

EXAMPLE 49

<Production of Developing Blade>

A plate made of stainless steel (SUS304, manufactured by Nisshin Steel Co., Ltd.) having a thickness of 0.08 mm was subjected to press cutting into dimensions measuring 200 mm long by 23 mm wide. Thus, a sheet made of stainless steel (hereinafter sometimes referred to as "SUS sheet") was prepared as the substrate 2. Next, as illustrated in FIG. 2, a coating film of the paint for forming a resin layer containing the copolymer A-1 and the dispersion liquid B-1 prepared in Example 1 was formed by dipping the SUS sheet in the paint so that a length L from a longitudinal side end portion of the sheet became 1.5 mm, and the coating film was dried. Further, the surface layer 3 formed of the resin layer having a thickness T of 10 μm was arranged on the surface of the longitudinal side end portion of the SUS sheet by subjecting the coating film to a heat treatment at a temperature of 150° C. for 1 hour. Thus, a developing blade according to Example 49 was produced.

In addition, 2.0 g of the paint was applied onto the SUS sheet with a bar coater (#120) to form a coating film, and then the coating film was dried. Further, heat curing was performed under the same conditions as the above-mentioned coating film curing conditions. Thus, a test piece for measuring physical properties corresponding to Example 49 was produced.

EXAMPLES 50 TO 53, AND COMPARATIVE EXAMPLE 7 AND COMPARATIVE EXAMPLE 8

Developing blades of Examples 50 to 53, and Comparative Example 7 and Comparative Example 8 were each obtained in the same manner as in the production method of Example 49 except that the paint for forming a resin layer was changed to a construction containing a copolymer shown in Table 7.

<Performance Evaluations of Developing Blade>

Such a developing roller for an evaluation as described below was produced and used in the performance evaluations of a developing blade.

<Production of Developing Roller to be Used in Performance Evaluations of Developing Blade>

(Preparation of Substrate)

A substrate constituting a developing roller for evaluating a developing blade was prepared in the same manner as in Example 1.

(Formation of Silicone Rubber Elastic Layer)

An elastic roller R-1 constituting a developing roller for evaluating a developing blade was produced in the same manner as in Example 1.

(Paint for Forming Surface Layer of Developing Roller for Evaluating Developing Blade)

Polyoxytetramethylene glycol (trade name: "PTMG3000"; manufactured by Sanyo Chemical Industries, Ltd.) of 100.0 parts by mass, 70.6 parts by mass of a modified polyisocyanate (trade name: "CORONATE 2521"; manufactured by Tosoh Corporation), and 30.0 parts by mass of carbon black (trade name: "MA230"; manufactured by Mitsubishi Chemical Corporation) were stirred and mixed, and the mixture was dissolved and mixed in MEK so that a total solid content ratio became 30 mass %, followed by uniform dispersion with a sand mill. Further, the viscosity of the resultant was adjusted to from 10 cps to 12 cps with MEK. Thus, a paint B'-1 for forming the surface layer of a developing roller for evaluating a developing blade was obtained.

(Formation of Surface Layer)

The resultant paint B'-1 for forming the surface layer of a developing roller for evaluating a developing blade was stirred overnight so that the solvent did not volatilize, and then the produced elastic roller R-1 was subjected to dip coating with the paint. Thus, a coating film of the paint was formed on the surface of the elastic layer of the elastic roller, and the coating film was dried. Further, the paint was subjected to a heat treatment at a temperature of 150° C. for 2 hours and 30 minutes to be cured. Thus, a developing roller G'-1 for evaluating a developing blade in which the surface layer (resin layer) 3 having a thickness of about 15 μm was arranged on the outer periphery of the elastic layer 4 was produced.

The developing blades according to Example 49 to Example 53, and Comparative Example 7 and Comparative Example 8 were subjected to the following evaluations. The results of the evaluations are shown in Table 7.

[Evaluation (1): Measurement of Triboelectric Charge Quantity of Test Piece]

Measurement was performed under the same conditions as those of the evaluation in a developing roller.

[Evaluation (2): Measurement of Tack Value of Test Piece]

Measurement was performed under the same conditions as those of the evaluation in a developing roller.

[Evaluation (3): Measurement of Initial Sticking Concentration]

The initial sticking concentration of a toner was evaluated by the following method.

The developing blade of each example or each comparative example, and the developing roller G'-1 for evaluating a developing blade were mounted onto a yellow toner cartridge for a laser printer (trade name: "LBP5300"; manufactured by Canon Inc.). The yellow toner cartridge was loaded into the laser printer. Then, the output operation of a white solid image was performed with the laser printer, and a state in which the surface of the developing blade was coated with a yellow toner was established. The developing blade in such state was removed from the yellow toner cartridge.

The removed developing blade was mounted on a flat plate made of polytetrafluoroethylene. The developing blade was brought into press contact with the flat plate at a load of 300 gf (a load of 150 gf on each of both ends of the mandrel), and was left to stand under an environment having a temperature of 40° C. and a relative humidity of 95% for 3 months. Next, the developing blade was released from the state of being brought into press contact with the flat plate, and was left at rest under an environment having a temperature of 25° C. and a relative humidity of 45% for 3 hours. After that, the surface of the developing blade was subjected to air blowing.

Next, the toner sticking onto the developing blade was peeled with an adhesive tape. The adhesive tape having adhered thereto the yellow toner was placed on plain paper, and its reflection density was measured with a reflection densitometer (trade name: "TC-6DS/A"; manufactured by Tokyo Denshoku Co., Ltd.). In addition, as a control, an adhesive tape having adhered thereto no toner was similarly placed on plain paper, and its reflection density was similarly measured. Then, the reduction amount (%) of a reflectance was calculated with reference to the reflection density of the adhesive tape having adhered thereto no toner. The measurement was performed at a total of three points, i.e., the central portion and both end portions of the developing blade, and the arithmetic average of the measured values was defined as the initial sticking concentration of the toner in the developing blade to be evaluated.

[Evaluation (4): Q/M Measurement]

In order for the charge-imparting performance of a developing blade for a developer to be evaluated, Q/M measurement was performed. Under an environment having a temperature of 40° C. and a relative humidity of 95%, the developing blade of each example or each comparative example, and the developing roller G'-1 for evaluating a developing blade were mounted onto a black toner cartridge for a laser printer (trade name: "LBP5300"; manufactured by Canon Inc.). The black toner cartridge was loaded into the laser printer, and was left to stand under the environment having a temperature of 40° C. and a relative humidity of 95% for 3 months. After the standing, under the same environment, the output operation of a white solid image was performed with the laser printer, and a state in which the surface of the developing roller brought into abutment with the developing blade was coated with a black toner was established. The developing roller in such state was removed from the black toner cartridge.

Next, under the environment having a temperature of 40° C. and a relative humidity of 95%, the developer carried on the developing roller was sucked and collected with a metal cylindrical tube and a cylindrical filter. At that time, a quantity Q (μC) of charge stored in a capacitor through the metal cylindrical tube, and a mass M (g) of the sucked developer were measured. A charge quantity Q/M per unit mass (μC/g) was calculated from those values. When a negatively chargeable developer is used, the sign of the Q/M is negative. Accordingly, as the absolute value of the Q/M becomes larger, it can be said that the charge-imparting performance of the developing blade for the developer becomes higher.

[Evaluation (5): Fogging Measurement]

Measurement was performed under the same conditions as those of the evaluation in an electrophotographic roller, provided that the developing roller G'-1 for evaluating a developing blade was used as a developing roller.

[Evaluation (6): Confirmation of Regulation Failure]

Confirmation was performed under the same conditions as those of the evaluation in an electrophotographic roller, provided that the developing roller G'-1 for evaluating a developing blade was used as a developing roller.

TABLE 7

| | Copolymer | Dispersion liquid | Evaluation (1) Q/M (μC/g) | Evaluation (2) Tack value (gf) | Evaluation (3) Initial sticking concentration (reduction amount of reflectance) (%) | Evaluation (4) Q/M (μC/g) | Evaluation (5) Fogging (%) | Evaluation (6) Regulation failure |
|---|---|---|---|---|---|---|---|---|
| Example 49 | A-1 | B-1 | −4.0 | 51 | 1.5 | −37.0 | 1.2 | Absent |
| Example 50 | A-2 | | −4.2 | 31 | 0.8 | −39.0 | 1.3 | Absent |
| Example 51 | A-3 | | −4.1 | 35 | 0.9 | −40.0 | 1.3 | Absent |
| Example 52 | A-4 | | −4.0 | 49 | 1.3 | −39.0 | 1.1 | Absent |
| Example 53 | A-6 | | −3.9 | 43 | 1.0 | −38.0 | 1.2 | Absent |
| Comparative Example 7 | H-3 | B-1 | −2.5 | 88 | 5.3 | −24.0 | 3.8 | Absent |
| Comparative Example 8 | H-5 | | −2.7 | 86 | 4.8 | −21.0 | 4.0 | Absent |

In each of the cases where the developing blades of Example 49 to Example 53 are used, the initial sticking concentration is low, the Q/M is satisfactory, and the suppression of the fogging is also satisfactory. It is found from the foregoing results that both the charge-imparting performance and the fogging performance are satisfactorily achieved. Meanwhile, the developing blades of Comparative Example 7 and Comparative Example 8 are each poor in initial sticking performance. This is assumed to result from the fact that the blades are each free of any nitrogen-containing aromatic heterocyclic amine structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-020885, filed Feb. 5, 2016, which is hereby incorporated by reference herein in its entirety.

What is claimed is:

1. An electrophotographic member, comprising:
a substrate; and
a surface layer,
wherein the surface layer satisfies the following requirements (A) and (B):
(A) the surface layer contains, in a region from a surface thereof to a depth of up to 0.1 μm, a copolymer containing:
a constituent unit represented by the following structural formula (1); and
at least one selected from the group consisting of a constituent unit represented by the following structural formula (2) and a constituent unit represented by the following structural formula (3):

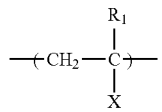

(1)

in the structural formula (1), $R_1$ represents a methyl group or a hydrogen atom, and X represents an atomic group having a nitrogen-containing aromatic heterocyclic amine structure;

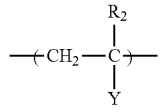

(2)

in the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms;

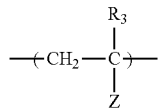

(3)

in the structural formula (3), $R_3$ represents a methyl group or a hydrogen atom, and Z represents an atomic group having a silicone structure; and (B) a concentration of a nitrogen atom derived from the nitrogen-containing aromatic heterocyclic amine structure in the copolymer is from 6.0 mass % to 30.0 mass %.

2. The electrophotographic member according to claim 1, wherein the surface layer further contains a binder resin.

3. The electrophotographic member according to claim 2, wherein the binder resin comprises a polyurethane resin.

4. A method of producing the electrophotographic member according to claim 1 including a substrate and a surface layer, the method comprising forming the surface layer by applying, to the substrate, a copolymer containing:
a constituent unit represented by the following structural formula (1); and
at least one selected from the group consisting of a constituent unit represented by the following structural formula (2) and a constituent unit represented by the following structural formula (3):

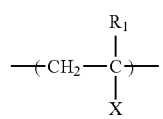

(1)

in the structural formula (1), $R_1$ represents a methyl group or a hydrogen atom, and X represents an atomic group having a nitrogen-containing aromatic heterocyclic amine structure;

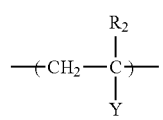

(2)

in the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms;

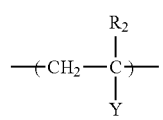

(3)

in the structural formula (3), $R_3$ represents a methyl group or a hydrogen atom, and Z represents an atomic group having a silicone structure.

5. A method of producing the electrophotographic member according to claim 4, wherein the forming the surface layer comprises mixing the copolymer in a binder resin, followed by application of the mixture to the substrate to form the surface layer.

6. A method of producing the electrophotographic member according to claim 5, wherein the binder resin comprises a polyurethane resin.

7. A process cartridge, which is removably mounted onto a main body of an electrophotographic apparatus, the process cartridge comprising the electrophotographic member according to claim 1, the electrophotographic member comprising:

a substrate; and
a surface layer,
wherein the surface layer satisfies the following requirements (A) and (B):
(A) the surface layer contains, in a region from a surface thereof to a depth of up to 0.1 μm, a copolymer containing:
a constituent unit represented by the following structural formula (1); and
at least one selected from the group consisting of a constituent unit represented by the following structural formula (2) and a constituent unit represented by the following structural formula (3):

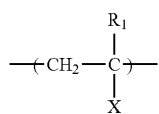

(1)

in the structural formula (1), $R_1$ represents a methyl group or a hydrogen atom, and X represents an atomic group having a nitrogen-containing aromatic heterocyclic amine structure;

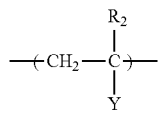

(2)

in the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms;

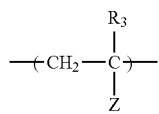

(3)

in the structural formula (3), $R_3$ represents a methyl group or a hydrogen atom, and Z represents an atomic group having a silicone structure; and
(B) a concentration of a nitrogen atom derived from the nitrogen-containing aromatic heterocyclic amine structure in the copolymer is from 6.0 mass % to 30.0 mass %.

8. An electrophotographic apparatus, comprising the electrophotographic member, the electrophotographic member according to claim 1 comprising:

a substrate; and
a surface layer,
wherein the surface layer satisfies the following requirements (A) and (B):
(A) the surface layer contains, in a region from a surface thereof to a depth of up to 0.1 μm, a copolymer containing:
a constituent unit represented by the following structural formula (1); and
at least one selected from the group consisting of a constituent unit represented by the following structural formula (2) and a constituent unit represented by the following structural formula (3):

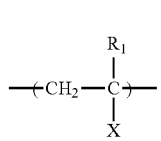

(1)

in the structural formula (1), $R_1$ represents a methyl group or a hydrogen atom, and X represents an atomic group having a nitrogen-containing aromatic heterocyclic amine structure;

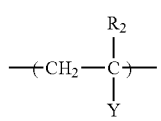

(2)

in the structural formula (2), $R_2$ represents a methyl group or a hydrogen atom, and Y represents an atomic group having a linear or branched alkyl structure having 10 to 18 carbon atoms, or a cycloalkyl structure having 10 to 18 carbon atoms;

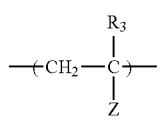

(3)

in the structural formula (3), $R_3$ represents a methyl group or a hydrogen atom, and Z represents an atomic group having a silicone structure; and
(B) a concentration of a nitrogen atom derived from the nitrogen-containing aromatic heterocyclic amine structure in the copolymer is from 6.0 mass % to 30.0 mass %.

* * * * *